(12) United States Patent
Ellison et al.

(10) Patent No.: US 9,965,501 B2
(45) Date of Patent: May 8, 2018

(54) TECHNIQUES FOR MAINTAINING COLUMN VECTORS OF RELATIONAL DATA WITHIN VOLATILE MEMORY

(71) Applicant: Oracle International Corporation, Redwood Shores, CA (US)

(72) Inventors: Lawrence J. Ellison, Woodside, CA (US); Amit Ganesh, San Jose, CA (US); Vineet Marwah, San Ramon, CA (US); Jesse Kamp, Castro Valley, CA (US); Anindya C. Patthak, Fremont, CA (US); Shasank K. Chavan, Menlo Park, CA (US); Michael J. Gleeson, Saratoga, CA (US); Allison L. Holloway, San Carlos, CA (US); Manosiz Bhattacharyya, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days. days.

(21) Appl. No.: 14/955,368

(22) Filed: Dec. 1, 2015

(65) Prior Publication Data

US 2016/0085781 A1  Mar. 24, 2016

Related U.S. Application Data

(63) Continuation of application No. 13/916,284, filed on Jun. 12, 2013, now Pat. No. 9,201,944, which is a
(Continued)

(51) Int. Cl.
*G06F 17/30* (2006.01)
*G06F 9/38* (2018.01)
*G06F 15/82* (2006.01)

(52) U.S. Cl.
CPC ...... *G06F 17/30315* (2013.01); *G06F 9/3887* (2013.01); *G06F 17/30339* (2013.01); *G06F 17/30595* (2013.01)

(58) Field of Classification Search
USPC .......................... 707/714, 802, 845; 711/109
See application file for complete search history.

(56) References Cited

U.S. PATENT DOCUMENTS

| 4,782,325 A | 11/1988 | Jeppsson et al. |
| RE34,052 E | 9/1992 | Hester et al. |

(Continued)

FOREIGN PATENT DOCUMENTS

| EP | 1 111 500 A1 | 3/1996 |
| EP | 2 040 180 A1 | 3/2009 |

(Continued)

OTHER PUBLICATIONS

Park et al., "Polymorphic Pipeline Array: A Flexible Multicore Accelerator with Virtualized Execution for Mobile Multimedia Applications", Dated Dec. 12, 2009 11 pages.

(Continued)

*Primary Examiner* — Hung T Vy
(74) *Attorney, Agent, or Firm* — Hickman Palermo Becker Bingham LLP

(57) ABSTRACT

Techniques are provided for more efficiently using the bandwidth of the I/O path between a CPU and volatile memory during the performance of database operation. Relational data from a relational table is stored in volatile memory as column vectors, where each column vector contains values for a particular column of the table. A binary-comparable format may be used to represent each value within a column vector, regardless of the data type associated with the column. The column vectors may be compressed and/or encoded while in volatile memory, and
(Continued)

decompressed/decoded on-the-fly within the CPU. Alternatively, the CPU may be designed to perform operations directly on the compressed and/or encoded column vector data. In addition, techniques are described that enable the CPU to perform vector processing operations on the column vector values.

20 Claims, 12 Drawing Sheets

Related U.S. Application Data continuation of application No. 13/708,060, filed on Dec. 7, 2012, now Pat. No. 8,521,788.

(60) Provisional application No. 61/709,142, filed on Oct. 2, 2012, provisional application No. 61/568,644, filed on Dec. 8, 2011.

(56) References Cited

U.S. PATENT DOCUMENTS

| | | | |
|---|---|---|---|
| 5,423,010 | A | 6/1995 | Mizukami |
| 5,499,382 | A * | 3/1996 | Nusinov ............... G06F 5/00 711/109 |
| 5,506,979 | A * | 4/1996 | Menon ............. G06F 11/1008 711/112 |
| 5,581,705 | A | 12/1996 | Passint et al. |
| 5,617,567 | A | 4/1997 | Doktor |
| 5,826,259 | A | 10/1998 | Doktor |
| 6,047,081 | A | 4/2000 | Groezinger et al. |
| 6,317,824 | B1 | 11/2001 | Thakkar et al. |
| 6,496,830 | B1 * | 12/2002 | Jenkins, Jr. ....... G06F 17/30595 |
| 6,671,797 | B1 | 12/2003 | Golston |
| 6,745,174 | B2 | 6/2004 | Levy et al. |
| 6,826,522 | B1 | 11/2004 | Moller et al. |
| 6,842,848 | B2 | 1/2005 | Hokenek et al. |
| 7,047,252 | B2 | 5/2006 | Buch et al. |
| 7,634,637 | B1 * | 12/2009 | Lindholm ............. G06F 9/3851 712/13 |
| 7,725,595 | B1 | 5/2010 | Geissler et al. |
| 7,769,726 | B2 | 8/2010 | Faerber et al. |
| 7,861,060 | B1 | 12/2010 | Nickolls et al. |
| 7,941,520 | B1 * | 5/2011 | Kite .................. H04M 3/2245 379/247 |
| 7,991,794 | B2 | 8/2011 | Bedi et al. |
| 8,049,760 | B2 | 11/2011 | Jiao et al. |
| 8,126,855 | B2 | 2/2012 | Faerber et al. |
| 8,260,803 | B2 | 9/2012 | Hsu et al. |
| 8,285,709 | B2 | 10/2012 | Canadea et al. |
| 8,326,810 | B2 | 12/2012 | Faerber et al. |
| 8,521,788 | B2 | 8/2013 | Ellison et al. |
| 8,533,216 | B2 | 9/2013 | Buger et al. |
| 8,543,534 | B2 | 9/2013 | Alves et al. |
| 8,572,131 | B2 | 10/2013 | Ellison et al. |
| 8,645,337 | B2 | 2/2014 | Kapoor et al. |
| 8,725,707 | B2 | 5/2014 | Chen et al. |
| 8,938,644 | B2 | 1/2015 | Clark et al. |
| 8,996,463 | B2 | 3/2015 | Merriman et al. |
| 2002/0184392 | A1 | 12/2002 | Pathasarathy et al. |
| 2002/0188830 | A1 | 12/2002 | Boles et al. |
| 2003/0135495 | A1 * | 7/2003 | Vagnozzi .......... G06F 17/30324 |
| 2005/0177706 | A1 | 8/2005 | Lee |
| 2007/0203925 | A1 | 8/2007 | Sandler et al. |
| 2008/0046686 | A1 | 2/2008 | Cameron |
| 2008/0294863 | A1 | 11/2008 | Faerber et al. |
| 2009/0037700 | A1 | 2/2009 | Graham |
| 2009/0254532 | A1 * | 10/2009 | Yang ................. G06F 17/30315 |
| 2009/0307290 | A1 | 12/2009 | Barsness et al. |
| 2010/0030796 | A1 | 2/2010 | Netz et al. |
| 2010/0088309 | A1 * | 4/2010 | Petculescu .......... G06F 17/3048 707/714 |
| 2010/0278446 | A1 | 11/2010 | Ganesh et al. |
| 2010/0299316 | A1 | 11/2010 | Faerber et al. |
| 2011/0029557 | A1 | 2/2011 | Raghavan et al. |
| 2012/0054225 | A1 | 2/2012 | Marwah et al. |
| 2012/0303633 | A1 | 11/2012 | He et al. |
| 2013/0151567 | A1 | 6/2013 | Ellison et al. |
| 2013/0151568 | A1 | 6/2013 | Ellison et al. |
| 2013/0275473 | A1 | 10/2013 | Ellison et al. |
| 2014/0013076 | A1 | 1/2014 | Ganesh et al. |
| 2014/0013077 | A1 | 1/2014 | Ganesh et al. |
| 2014/0013078 | A1 | 1/2014 | Ganesh et al. |
| 2014/0095748 | A1 | 4/2014 | Aingaran et al. |
| 2014/0096145 | A1 | 4/2014 | Aingaran et al. |

FOREIGN PATENT DOCUMENTS

| | | |
|---|---|---|
| EP | 2423843 A1 | 2/2012 |
| GB | 12 332 631 A | 10/1973 |
| JP | 2000261674 A | 9/2000 |
| WO | WO 00/08552 | 2/2000 |
| WO | WO2010/039895 | 4/2010 |
| WO | WO 2013/095653 A1 | 6/2013 |
| WO | WO 2013/095662 A1 | 6/2013 |

OTHER PUBLICATIONS

"MonetDB", Wikipedia, available: http://en.wikipedia.org/wiki/MonetDB, May 16, 2012, 3 pages.

Brewer et al., "Remote Queues: Exposing Message Queues for Optimization and Atomicity", dated Jul. 17, 1995, ACM, 12 pages.

CCCP: Accelerator Vitualization, http://cccp.eecs.umich.edu/research/virtual.php, printed on Jul. 4 2012, 3 pages.

Claims from PCT Application No. PCT/US2012/068526, dated Mar. 2013, 3 pages.

Dynamic Scheduling Techniques, http://www.cs.iastate.edu/~prabhu/Tutorial/PIPELINE/dynamSchedTech.html, printed on Jul. 4, 2012, 2 pages.

IBM, "Technical Disclosure Bulletin", Data Packing and Unpacking Scheme for High Performance Image Processing, vol. 36, No. 7, dated Jul. 1993, 6 pages.

Khalid Sayood:, "Introduction to data Compression", Morgan Kaufmann Publisher, dated Dec. 1996, 4 pages.

"Column Store features" monetdb, available: http://www.moneydb.org/Home/Features, 2008-2013, 3 pages.

Notification of Transmittal of the International Search Report and the Written Opinion of the International Searching Authority, PCT Application No. PCT/US2012/068531 dated Mar. 20, 2013, 11 pages.

Zukowski, M. "Vectorwise: Beyond Column Stores" ACTIAN 2012, 17 pages.

Phipps, Colin:, "Mapping Deflated Files", Internet Article, dated Jan. 6, 2013, http://zsync.moria.org.uk/paper/ch03s02.html, 3 pages.

Schmit et al., "PipeRench: A Virtualized Programmable Datapath in 0.18 Micron Technology", dated 2002, 4 pages.

Silva et al., "Using a Tighly-Coupled Pipeline in Dynamically Reconfigureable Platform FPGAs", dated May 2003, 4 pages.

Von Eicken et al., "Active Messages: A Mechanism for Integrated Communication and Computation", dated 1992, ACM, 12 pages.

W. Cockshott et al., "High-Performance Operations Using a Compressed Database Architecture", The Computer Journal, vol. 41, 1998, 14 pages.

Weinhardt, Markus, "Compilation and Pipeline Synthesis for Reconfigurable Architectures", 1997, 8 pages.

Wikipedia, "In Memory Database", Dated Jan. 30, 2013, 4 pages.

Wikipedia, "SIMD, Single Instruction Multiple Instruction", dated Jan. 1, 2013, 7 pages.

Notification of Transmittal of the International Search Report and the Written Opinion of the International Searching Authority, PCT Application No. PCT/US2012/068526, dated Mar. 20, 2013, 11 pages.

U.S. Appl. No. 13/916,284, filed Jun. 12, 2013, Advisory Action, dated Apr. 24, 2015.

U.S. Appl. No. 13/916,284, filed Jun. 12, 2013, Office Action, dated Aug. 15, 2014.

(56) References Cited

OTHER PUBLICATIONS

U.S. Appl. No. 13/916,284, filed Jun. 12, 2013, Office Action, dated May 19, 2015.
U.S. Appl. No. 13/916,284, filed Jun. 12, 2013, Notice of Allowance, dated Jul. 27, 2015.
U.S. Appl. No. 13/916,284, filed Jun. 12, 2013, Interview Summary, dated Jul. 2, 2015.
U.S. Appl. No. 13/916,284, filed Jun. 12, 2013, Interview Summary, dated Mar. 27, 2015.
U.S. Appl. No. 13/916,284, filed Jun. 12, 2013, Interview Summary, dated Feb. 11, 2015.
U.S. Appl. No. 13/916,284, filed Jun. 12, 2013, Final Office Action, dated Dec. 15, 2014.
U.S. Appl. No. 13/916,284, filed Jun. 12, 2013, Advisory Action, dated Mar. 10, 2015.

* cited by examiner

TABLE 100

|    | c1   | c2   | c3   | c4   | c5   |
|----|------|------|------|------|------|
| r1 | r1c1 | r1c2 | r1c3 | r1c4 | r1c5 |
| r2 | r2c1 | r2c2 | r2c3 | r2c4 | r2c5 |
| r3 | r3c1 | r3c2 | r3c3 | r3c4 | r3c5 |
| r4 | r4c1 | r4c2 | r4c3 | r4c4 | r4c5 |
| r5 | r5c1 | r5c2 | r5c3 | r5c4 | r5c5 |
| r6 | r6c1 | r6c2 | r6c3 | r6c4 | r6c5 |
| r7 | r7c1 | r7c2 | r7c3 | r7c4 | r7c5 |
| r8 | r8c1 | r8c2 | r8c3 | r8c4 | r8c5 |

FIG. 1

TECHNIQUES FOR MAINTAINING COLUMN VECTORS OF RELATIONAL DATA WITHIN VOLATILE MEMORY

CROSS-REFERENCE TO RELATED APPLICATIONS; BENEFIT CLAIM

This application is a Continuation of U.S. Pat. No. 9,201,944, filed Jun. 12, 2013 and issued on Dec. 1, 2015, which is a Continuation of U.S. patent application Ser. No. 13/708,060, filed Dec. 7, 2012, which claims the benefit of Provisional Appln. 61/709,142, filed Oct. 2, 2012, and of Provisional Appln. 61/568,644, filed Dec. 8, 2011; the entire contents of these of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

This application is also related to U.S. patent application Ser. No. 13/708,054, entitled "TECHNIQUES FOR MORE EFFICIENT USAGE OF MEMORY-TO-CPU BANDWIDTH", filed on Dec. 7, 2012, the content of which is hereby incorporated by reference as if fully set forth herein.

FIELD OF THE INVENTION

The present invention relates to relational database systems and, more specifically, to techniques for storing data, that logically resides in relational structures, in volatile memory in a manner that increases the efficiency of database operations.

BACKGROUND

Relational database systems store data in relational structures, such as tables and indexes. However, the actual format in which the data is stored, retrieved, and manipulated, often bears little relationship to the logical structure of a table.

For example, FIG. 1 is a block diagram of a conventional relational table 100. Relational table 100 includes rows r1 to r8, and columns c1 to c5. Each row typically corresponds to a logical entity, and each column corresponds to an attribute of that entity. For example, in an employee table, each row may correspond to an employee, and each column may correspond to a distinct employee attribute (name, age, salary, phone number, etc.).

The intersection of a row and column defines a cell. The value stored in a given cell is the value, for the attribute associated with the column, for the entity associated with the row. For example, assume that row r2 is associated with an employee named "Mary", and that column c2 is for the attribute "age". Under these circumstances, the value (illustrated as r2c2) stored in the cell formed by row r2 and column c2 may be 17, to indicate that Mary is 17 years old.

Various database languages have been developed to easily access data that is managed by relational database systems. One common database language is SQL. Such languages allow users to form queries that reference the data as if the data were actually stored in relational structures. However, the actual structures in which the relational data is stored and accessed is often significantly more complicated than simple two-dimensional tables.

For example, FIG. 2 illustrates how the data from table 100 may actually be stored on a disk 200 by a relational database system. As illustrated in FIG. 2, the data for the table is spread among several disk blocks 202, 212 and 222.

Within a disk block, the data for any given row is typically stored contiguously. A storage format in which data for each row is stored contiguously is referred to as a "row-major format". For example, the values for the various columns of row r1 are stored contiguously within disk block 202.

However, values for certain rows, such as rows r3 and r5, may actually span two disk blocks. For example, the values for columns c1 and c2 of row r3 are in disk block 202, while the values for columns c3, c4 and c5 of row r3 are in disk block 212.

The disk blocks that store data for any given table may be spread throughout a disk, in no particular order. Each disk block typically has a section that stores the actual values that logically populate the table (the "relational data"), and a header that stores metadata about the relational data. For example, disk blocks 202, 212 and 222 respectively have headers 204, 214 and 224, and relational data portions 206, 216, and 226. An example of how relational data may be organized within disk blocks is illustrated in U.S. Pat. No. 5,870,758 entitled "Method and Apparatus for Providing Isolation Levels in a Database System", filed on Mar. 11, 1996.

FIG. 3 is a block diagram of a typical database system 300 that may manage access to table 100. Referring to FIG. 3, a typical database system 300 includes a storage subsystem 320 on which the data managed by the database system 300 is durably stored. In the database system 300 illustrated in FIG. 3, the storage subsystem 320 includes the disk 200 that contains the disk blocks 202, 212 and 222 that store the relational data of table 100.

In addition to storage subsystem 320, database system 300 includes volatile memory 330 and a CPU 340. Typically, the size of the persistent storage used to store relational data is significantly greater than the size of the volatile memory 330 into which that data must be loaded when the data is the target of a database command. Consequently, relational database servers typically employ a buffer cache 332 in which a database server 334 temporarily store copies of the disk blocks that contain the data that is the target of a database operation. As illustrated in FIG. 3, a copy of disk block 202 has been loaded into buffer cache 332 in response to some data within disk block 202 being the target of an operation.

As database server 334 performs operations that target data stored in different disk blocks, the buffer cache 332 fills up with copies of those disk blocks. Once buffer cache 332 is full, loading a copy of a not-yet-loaded disk block into volatile memory involves replacing a copy of a disk block that was previously loaded into volatile memory. If the copy of the disk block that is being replaced has been changed, then the data from the disk block copy typically needs to be flushed back to disk.

Because moving data between volatile memory 330 and disk over I/O path 360 is orders of magnitude slower than moving data between volatile memory 330 and CPU 340 over I/O path 350, relational database systems have focused on minimizing the amount of I/O that occurs between storage subsystem 320 and volatile memory 330. For example, various techniques for intelligently caching relational data are described in U.S. patent application Ser. No. 12/691,146, entitled "Selectively Reading Data From Cache And Primary Storage". As another example, various techniques for compressing the relational data on disk 200, so that the same amount of I/O traffic path 360 can move more data, are described in U.S. patent application Ser. No. 12/617,669, entitled "Structure Of Hierarchical Compressed Data Structure For Tabular Data".

Unfortunately, techniques that minimize the traffic on I/O path 360 can lead to less-than-optimal use of I/O path 350. For example, because the copies of disk blocks that are stored in buffer cache 332 have substantially the same size, content, and organization as the disk blocks on disk 200, relational data can be transferred between volatile memory 330 and disk 200 with minimal conversion. However, once in volatile memory 330, that same disk-block format can be an obstacle to efficient processing of database operations.

For example, the query "select c1 from emp where c2>30" requests retrieval of values from column c1 for all rows that have a value in c2 that is greater than 30. The only data that is actually required to execute this query is the data from columns c1 and c2 of the emp table. In other words, to perform the requested operation, the values from columns c1 and c2 are the only values that CPU 340 needs to see. However, because the relational data is stored as disk block copies within buffer cache 332, and within those disk block copies the data is stored in row-major format, a large amount of irrelevant data will flow through I/O path 350 for the CPU 340 to obtain the data required to perform the operation perform the operation. In some situations, the values for potentially hundreds of columns may have to flow through I/O path 350 simply to enable CPU 340 to perform an operation that involves values from only one or two of those columns.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram that illustrates how a relational table is logically organized;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for more efficiently using the bandwidth of the I/O path between a CPU and volatile memory during the performance of database operation. For example, techniques are provided for organizing relational data in volatile memory in a manner that decreases the amount of data that must be transferred between the CPU and the volatile memory to perform a database operation.

In one embodiment, the relational data from a relational table is stored in volatile memory as column vectors, where each column vector contains values for a particular column of the table. The individual values within a column vector may be represented in a variety of formats. In one embodiment, a binary-comparable format is used to represent each value within a column vector, regardless of the data type associated with the column.

The column vectors may be compressed and/or encoded while in volatile memory, and decompressed/decoded on-the-fly within the CPU. Alternatively, the CPU may be designed to perform operations directly on the compressed and/or encoded column vector data. In addition, techniques are described that enable the CPU to perform the same operation, on multiple values from the same column, in a single instruction using vector processing. Using vector processing to simultaneously perform the same operation on multiple values from a given column, the CPU has a greater capacity to handle the increased rate at which the CPU is fed the column values on which the CPU must operate.

Column Vectors

Figure 4:
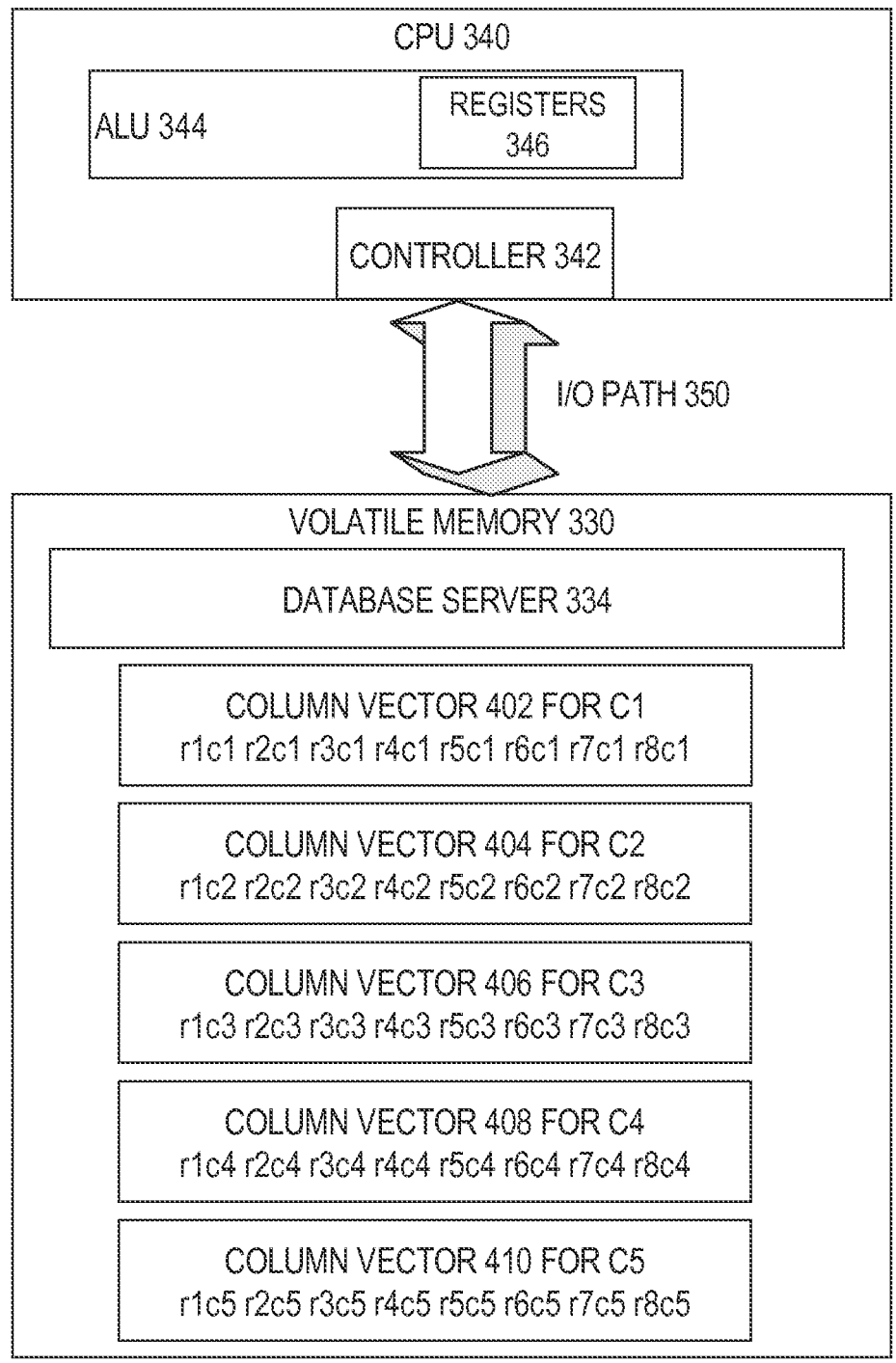
FIG. 4 is a block diagram that illustrates storing relational data in column vectors within volatile memory, according to an embodiment of the invention.

FIG. 4 is a block diagram that illustrates how relational data may be stored in volatile memory, according to an embodiment of the invention. As illustrated in FIG. 4, within volatile memory 330, the relational data is organized in column vectors, where each column vector contiguously stores the values that logically populate a corresponding column of table 100.

Specifically, in the example illustrated in FIG. 4, volatile memory stores column vectors 402, 404, 406, 408 and 410 that respectively correspond to columns c1, c2, c3, c4 and c5 of table 100 illustrated in FIG. 1. Unlike the block-based organization of relational data illustrated in volatile memory 330 in FIG. 3, the column vector organization of relational data illustrated in volatile memory 330 in FIG. 4 bears little resemblance to how relational data is conventionally organized on disk.

Because of the differences between how relational data is conventionally stored on disk, and a column vector organization of the relational data, a significant amount of overhead may be expended at system boot-up to load and organize the relational data within volatile memory 330 into column vectors. However, any such overhead may be more than offset by the more efficient use of I/O path 350, during the performance of database operations, that results from maintaining the relational data in the column vector format. In addition, that overhead may be reduced by storing the relational data in column-major format on disk, so that creating the column vectors within volatile memory 330 requires minimal re-arrangement of the data.

The column vector organization of relational data is particularly useful in situations where the relational data will rarely if ever need to be swapped out of volatile memory 330 to make room to load additional relational data from disk. For example, the column vector organization of relational data is particularly useful in systems where the amount of volatile memory is sufficient to hold the entire table columns that are targeted by an operation. Further, if the amount of volatile memory is sufficient to hold the entire database that is managed by database server 334, the volatile memory 330 may be treated as the primary storage of the relational data (as opposed to a cache), where disk storage is merely used for the initial loading and for backups. Even in situations where the entire table does not fit in memory, part of table fits into volatile memory, and the techniques described herein may be applied to a part that does fit in memory.

Because data is organized in the column vector format, similar data items are next to each other, which allows using certain compressed formats (e.g. RLE) and will typically produce better compression. These compressed formats allow more data to be held in memory, and also may enable queries on the in-memory data to run faster Efficient Usage of the I/O Path Between the CPU and Volatile Memory Storing relational data in column vector format within volatile memory results in more efficient use of I/O path 350 during performance of database operations. The improved efficiency is achieved by increasing the speed at which CPU 340 is fed the actual values that are required for a particular database operation. The faster CPU 340 is fed the values required by a database operation, the faster the database operation is performed.

The amount of data that a CPU can fetch over I/O path 350 in a clock cycle is referred to as a cache line. Because both the size of the cache line and the clock rate of CPU 340 are dictated by hardware, the bandwidth available on I/O path 350 typically remains constant.

Consequently, increasing the rate at which CPU 340 receives data required for a database operation involves increasing the percentage of that fixed bandwidth that is used to transfer information that is needed for the operation being performed. The percentage of the bandwidth of I/O path 350 that is used to transfer relevant information is referred to herein as the "relevance percentage".

Figure 2:
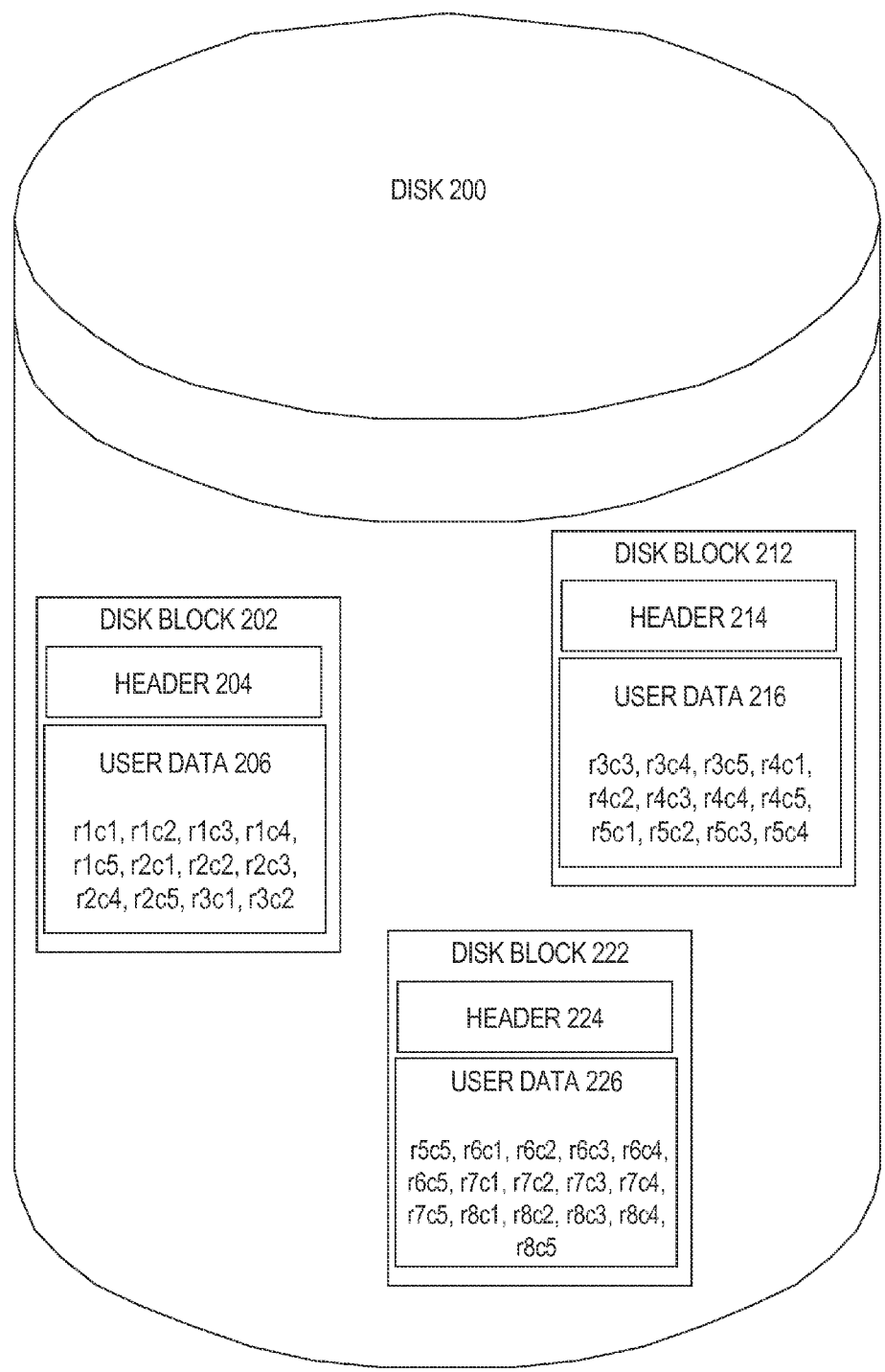
FIG. 2 is a block diagram that illustrates a typical on-disk organization of relational data for a relational table.
Figure 3:
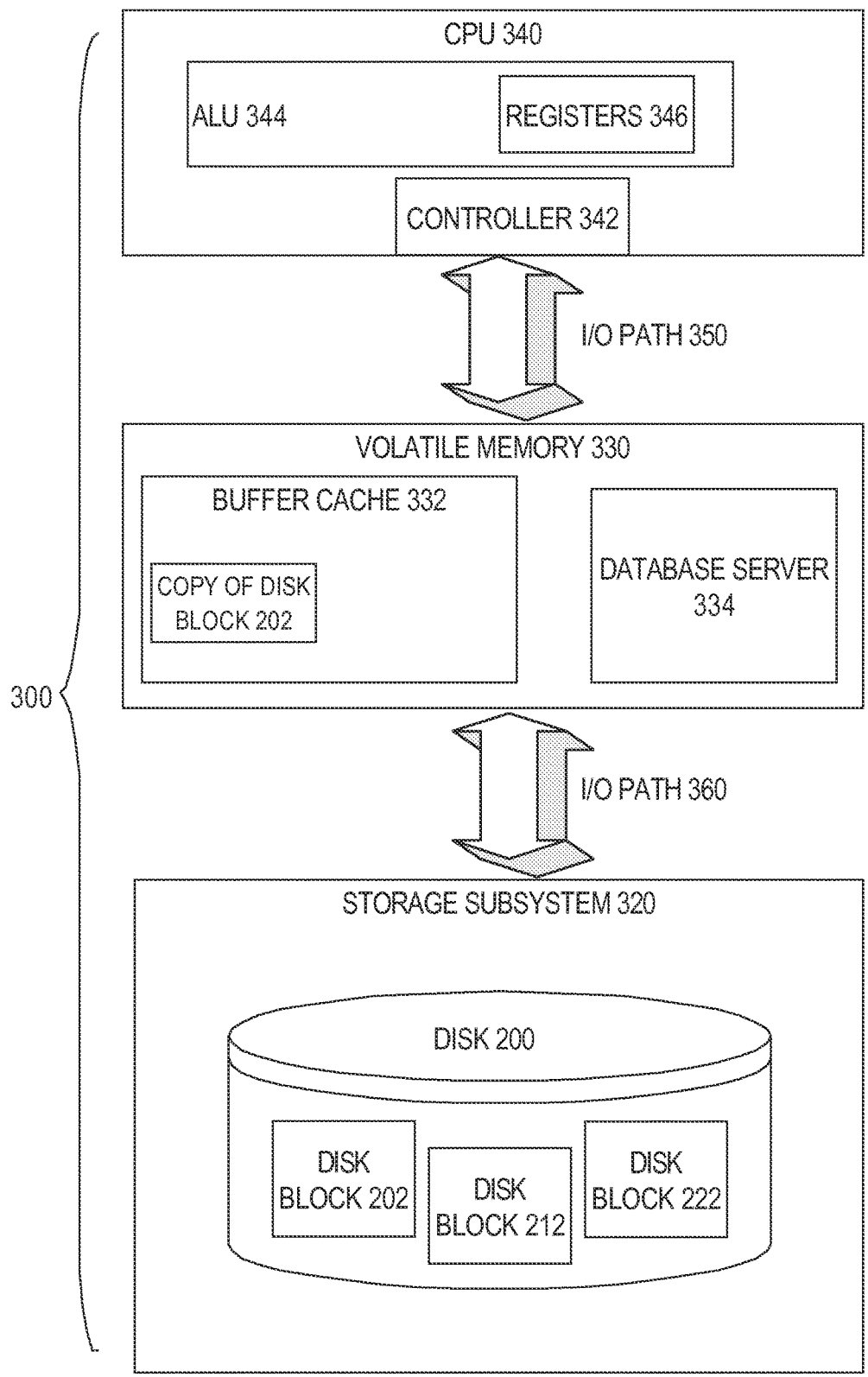
FIG. 3 is a block diagram that illustrates a typical relational database system.

When relational data is stored in volatile memory 330 in a block based format, as illustrated in FIG. 3, the relevance percentage may be very low. For example, assume that volatile memory 330 stores the data for table 100 in a block based format, and that database server 334 is executing the query "select c1 from emp where c2>30".

To perform this operation, the CPU 340 must compare all values in column c2 to the number 30. Assume that all values in table 100 are the same size, and that the cache line of CPU 340 is sufficient to accommodate five values from table 100. Under these circumstances, fetching the values of c2 from a block-based format would require eight clock cycles. During each of the eight clock cycles, CPU 340 would fetch one row of values. For example, during the first clock cycle, CPU 340 would fetch r1c1, r1c2, r1c3, r1c4 and r1c5. During the second clock cycle, CPU 340 would fetch r2c1, r2c2, r2c3, r2c4 and r2c5, etc. During each of the eight clock cycles, the relevance ratio would be 20%, because only the value from column c2 is relevant to the operation being performed, and the value from column c2 only uses ⅕ of the cache line. The remaining ⅘ of the cache line are used to transfer values from the other columns, which are not relevant to the operation being performed.

In contrast, fetching the values of c2 from the column vector format illustrated in FIG. 4 would take only two clock cycles. During the first clock cycle, the first five values (r1c2, r2c2, r3c2, r4c2, and r5c2) from column vector 404 would be fetched into CPU 340. During the second clock cycle, the remaining three values (r6c2, r7c2, r8c2) would be fetched. In this example, the relevance ratio during the first clock cycle is 100%, and during the second clock cycle is 60%. Further, the required data was provided to CPU 340 in ¼ the time required when the relational data is stored in a block based format.

Byte-Comparable Value Format

As illustrated above, storing relational data in column vector format within volatile memory 330 allows the data required by an operation to be fed to CPU 340 much faster than is possible when the relational data is organized in row-major block-based formats. However, if CPU 340 is not able to process the relevant values at the rate at which the relevant values are provided, much of the efficiency gained by organizing the relational data in column vector format may be lost.

Therefore, according to one embodiment, techniques are provided for representing relational data in a format that can be more efficiently processed by CPU 340. Specifically, in one embodiment, relational data is stored, within each column vector, in a byte-comparable format. A byte-comparable format is a format that allows two values to be compared on a byte-by-byte basis, where the first non-identical byte between two values accurately indicates which of the two values is greater than the other.

Figure 5:
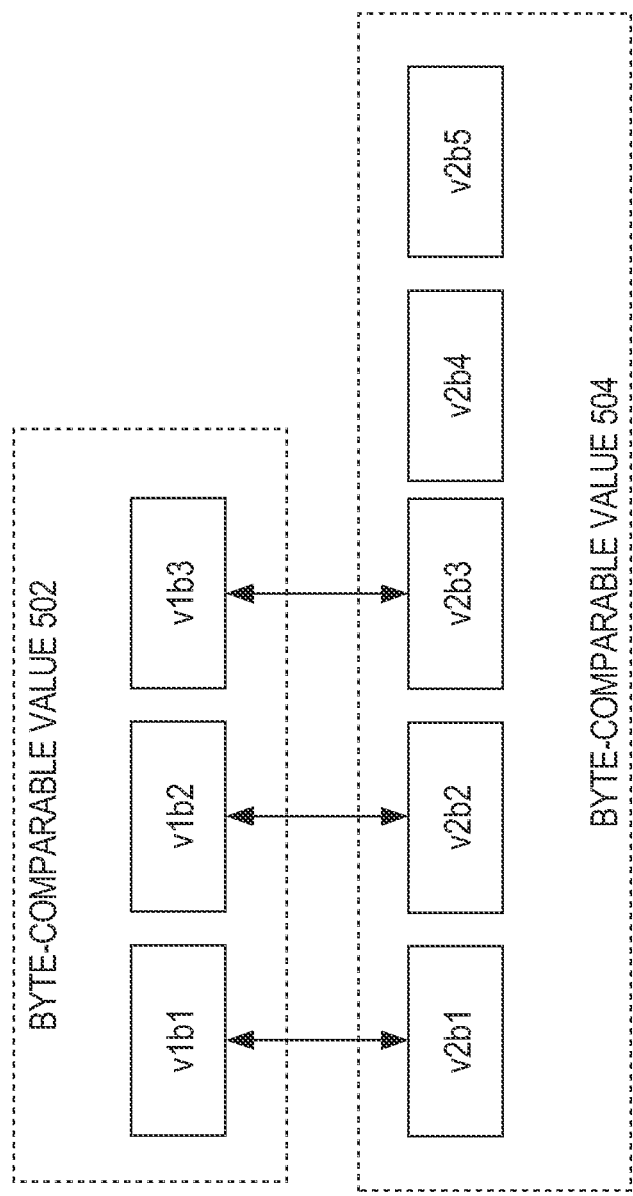
FIG. 5 is a block diagram illustrating a comparison between two byte-comparable values.

Referring to FIG. 5, it is a block diagram illustrating a comparison between a two values 502 and 504 that are represented in byte-comparable format. Initially, the left-most bytes of the two values (v1b1 and v2b1) are compared. If the bytes are not identical, then the comparison operation is finished and the value whose first byte was greater than the other is determined to be the greater value. For example, if v1b1 is greater than v2b1, then byte-comparable value 502 is greater than byte-comparable value 504, regardless of the remaining bytes of both values.

On the other hand, if the first bytes v1b1 and v2b1 are identical, then a comparison is made of the next two bytes v1b2 and v2b2. Similar to the comparison of the first bytes, if the second bytes are not identical, then the outcome of the comparison of the bytes determines the outcome of the comparison of the two values 502 and 504.

If the second bytes v1b2 and v2b2 are identical, a comparison is performed between the third bytes v1b3 and v2b3. The comparison operation proceeds in this fashion until either (a) non-identical bytes are encountered, or (b) one or both of the values runs out of bytes. In the case where one byte-comparable value runs out of bytes, the byte-comparable value that has not run out of bytes is determined to be greater than the byte-comparable value that ran out of bytes. For example, if v1b1, v1b2 and v1b3 are identical to v2b1, v2b2 and v2b3, then byte-comparable value 504 is determined to be larger than byte-comparable value 502.

If both byte-comparable values run out of bytes at the same time, and all compared bytes were identical, then the byte-comparable values are determined to be identical. Thus, if byte-comparable value 504 were only three bytes long, and those three bytes were identical to the three bytes of byte-comparable value 502, then byte-comparable values 502 and 504 would be determined to be identical.

While the byte-to-byte comparison illustrated in FIG. 5 has been described as a sequential operation, the byte-to-byte comparison can also be performed in parallel. For example, each of the bytes of byte-comparable value 502 may be compared to the corresponding bytes of byte-comparable value 504 at the same time. After the comparisons have been performed, the leftmost comparison that was not a match determines the outcome of the comparison between the two byte-comparable values. For example, bytes v1b1, v1b2 and v1b3 can be compared respectively to bytes v2b1, v2b2 and v2b3 at the same time. Under these circumstances, if the results are v1b1=v2b1, v1b2>v2b2 and v1b3<v2b3, then the v1b2>v2b2 comparison determines the outcome, and byte-comparable value 502 is determined to be greater than byte-comparable value 504.

Byte-comparable format is not limited to any particular data-type. For example, integers, dates, binary large objects (BLOBS), character large objects (CLOBS), floating point numbers, and strings can be stored in byte-comparable format. While the byte-to-byte comparison of integers indicates which integer is numerically greater, the byte-to-byte comparison of other types of values indicates different types of relationships. For example, a byte-to-byte comparison of dates that are in a byte-comparable format indicates which date is chronologically later than the other. Similarly, a byte-to-byte comparison of strings that are in a byte-comparable format indicates which string follows the other in alphabetical order.

The specific manner in which values from the various data types are represented in byte-comparable format may vary from implementation to implementation, and the techniques described here are not necessarily limited to any particular implementation. A detailed description of formats that may be used to represent values, with column vectors, in one embodiment of the invention is located at www.orafaq.com/wiki/Data_type, the entire contents of which are incorporated herein. In the formats described thereat, dates are represented, for example, in a 7-byte structure where the seven bytes are, respectively: century+100, year in the century+100, month, day, hour+1, minute+1, and second+1.

As illustrated in FIG. 5, byte-comparable values need not have the same number of bytes to be compared. However, as shall be described hereafter, there may be circumstances where it is desirable to force byte-comparable values to be a particular size. Under those circumstances, any padding bytes needed to increase the size of a byte-comparable value are added to the right of the existing bytes. For example, to increase the size of byte-comparable value 502 to five bytes, two padding bytes would be added after byte v1b3.

The padding of zeros to the right does not change the result of byte-comparisons for data types that do not permit trailing zeros because, even though the lengths become the same, the zeros will be always the smallest number. The NUMBER and DATE formats described at www.orafaq-.com/wiki/Data_type are examples of formats that do not allow trailing zeros in their values. Consequently, those formats are examples of comparison-preserving and lossless byte padded formats.

Treating Other Data Types as Binary Numbers

As mentioned above, the byte-comparable format can be used to represent data types, other than binary numbers, as a series of bytes. When data types that are not binary numbers are represented in a byte-comparable format, the CPU can perform comparisons on values of that data type using arithmetic logic by treating the byte-comparable values as binary numbers. For example, assume that CPU 340 has logic for performing arithmetic comparisons between eight-byte binary numbers. That same logic may be used to perform string-to-string comparisons between two strings that are represented in byte-comparable format. Specifically, the bytes of the two strings involved in the comparison operation would be padded, as needed, to form two eight-byte values. The eight-byte values would be loaded as if the values were eight-byte binary values into the appropriate registers within CPU 340, and CPU 340 would execute the instruction to perform a binary number comparison. The results of that comparison would then be used as the results of the comparison of the two strings represented by the values.

On-Chip Vector Processing Operations

Instead of, or in addition to, storing relational data in a byte-comparable format, the rate at which CPU 340 processes the values involved in a database operation may be increased by increasing the parallelism within CPU 340. In one embodiment, CPU 340 employs a SIMD (single instruction multiple data) architecture that allows the same operation to be performed on multiple data values at the same time. For example, during the performance of "select c1 from emp where c2>30", CPU 340 may simultaneously compare the value "30" to the values for c2 from multiple rows.

While embodiments are described herein in which SIMD instructions are used to increase the rate at which operations are performed on column values, in alternative embodiments performance may be increased without using SIMD instructions by performing tight iterations over the padded data using non-SIMD instructions. Thus, the techniques described herein are not limited to the use of SIMD instructions.

Figure 6:
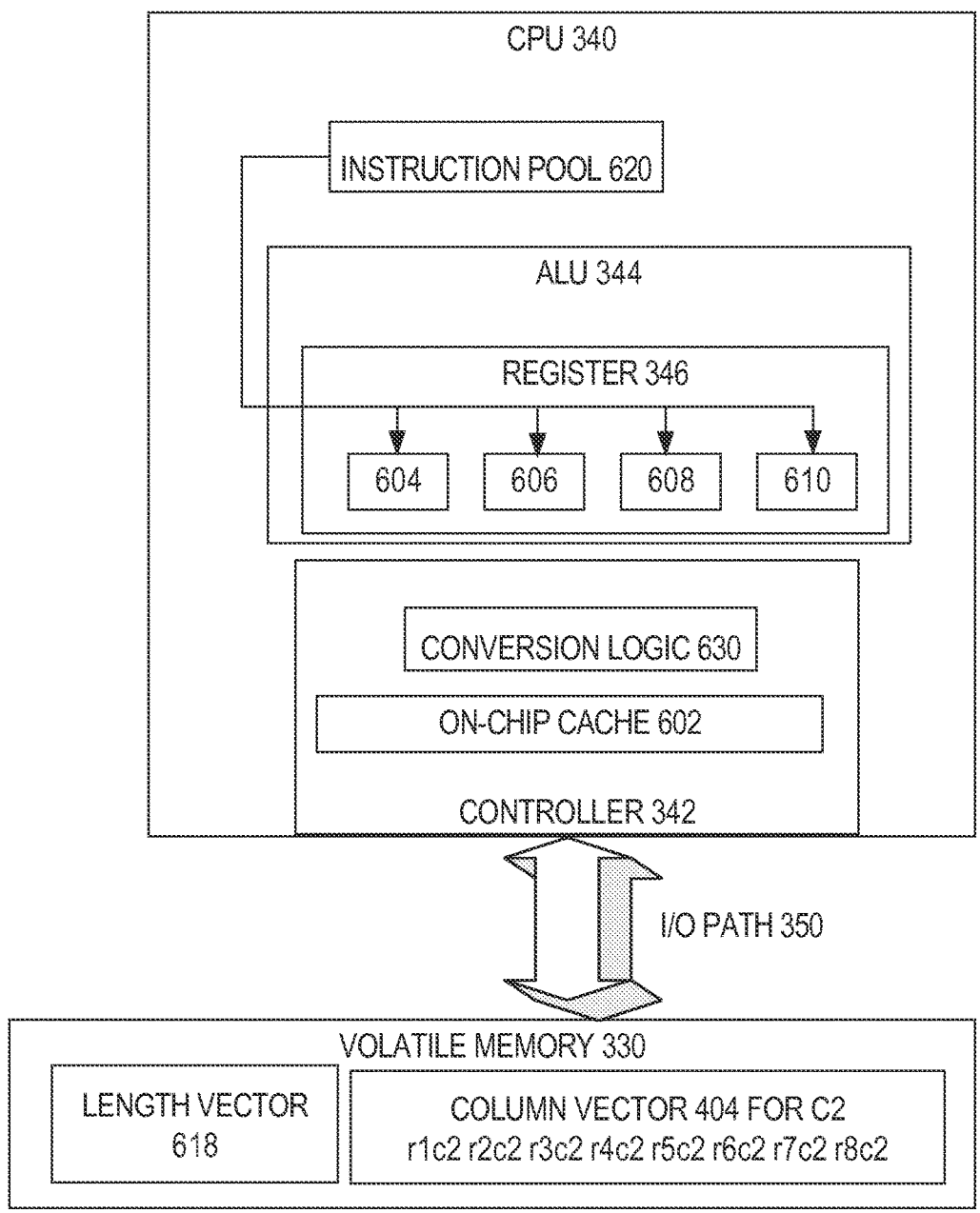
FIG. 6 is a block diagram illustrating a CPU that includes conversion logic for performing on-chip padding of variable-length column values to produce fixed-length values that may be used in vector processing operations, according to an embodiment of the invention.

FIG. 6 is a block diagram that illustrates CPU 340 in greater detail, according to an embodiment that employs on-chip vector processing. In the embodiment illustrated in FIG. 6, a register 346, within CPU 340, includes storage for storing values involved in operations. Register 346 may be, for example, a 256 bit register. For the purposes of SIMD operations, register 346 may be treated as an array of storage locations 604, 606, 608, and 610, each of which holds a fixed width data element. The number of fixed-width data elements that can be concurrently stored within register 346 vary based on the size of the data elements and the size of register 346. For example, if register 346 is a 256 bit register, register 346 may concurrently store four 8-byte wide fixed-width data elements, or eight 4-byte wide fixed-width data elements. The techniques described herein are not limited to any particular register size, nor any particular fixed width size of data elements.

Values from a column vector are loaded into each of storage locations 604-610, and the same operation (specified in an instruction from instruction pool 620) is performed on all of the values at the same time. For example, during a single step (which may take one or more clock cycles depending on the CPU implementation), values in each of storage locations 604-610 may be compared against a particular value.

A contiguous series of values from a column vector is referred to herein as a "segment" of the column vector. A segment that is the target of a vector processing operation is referred to herein as a "target segment". During a vector processing operation, all values within a target segment are processed within the CPU in parallel. The number of values that a CPU is able to process in parallel may vary based on a variety of factors, such as the number of registers available, whether the column vector is compressed or encoded, and whether the CPU is configured to handle variable-length values.

As mentioned above, to evaluate the predicate "c2>30", CPU 340 must compare all values in column c2 to the number 30. An embodiment that employs on-chip vector processing may perform the predicate evaluation by:

copying values from the column vector 404 into CPU 340 and, during each vector processing operation, comparing multiple values from the column vector 404 to the number 30.

For example, during the first vector processing operation performed to evaluate the predicate "c2>30", the values r1c2, r2c2, r3c2, and r4c2 may be loaded into storage locations 604, 606, 608 and 610, respectively, and compared to 30. During the second vector processing operation performed to evaluate predicate "c2>30", the values r5c2, r6c2, r7c2, and r8c2, may be loaded into storage locations 604, 606, 608 and 610, respectively, and compared to 30. Thus, using vector processing operations, the predicate "c2>30" may be evaluated in two vector processing operations, each of which takes a single step (which may equate to a single clock cycle of CPU 340, depending on the hardware).

Fixed-Length in-Memory Representation

Conventional SIMD architectures perform SIMD operations on fixed-width data elements. The fixed-width size that a CPU expects for the individual data elements that are targeted by SIMD operations is referred to herein as the "expected size". To facilitate SIMD operations in CPUs that have a specific expected size, an embodiment may store the relational data, within volatile memory 330, in a fixed-sized representation that corresponds to the expected size. For example, if CPU 340 is configured to perform SIMD operations on values that are 6 bytes wide, then 6 bytes are used to store each of the values in each of the column vectors 402, 404, 406, 408 and 410.

In an embodiment where fixed-sized values are required for the CPU 340 to perform SIMD operations, storing the relational data in a fixed-size format that matches the expected size avoids the need to reformat the relational data as the data moves between volatile memory 330 and the register 346 used to perform the vector processing operations.

However, not all relational values require the same amount of memory. Therefore, in one embodiment, padding is applied to the relational values prior to storing the relational values in volatile memory 330. The amount of padding added to a relational value is based on the difference between the inherent size of the relational value and the expected size used by CPU 340. For example, if CPU 340 is designed to perform SIMD operations on values that are 6 bytes wide, then a relational value that is already 6 bytes would not be padded at all, but a relational value that is 1 byte would be padded with 5 bytes.

Unfortunately, padding the values that are maintained within the column vectors within volatile memory 330 consumes more volatile memory 330 than is necessary to represent those values. In addition, because the padded values are larger than non-padded values, fewer padded values can be transferred over I/O path 350 in any given clock cycle. Therefore, in alternative embodiments that are described in greater detail hereafter, padding is performed after the values have been transferred to CPU 340, or not at all.

Column Vector Chunks

In the example given above, it was assumed that the CPU supported SIMD operations on values of a particular fixed size, and padding was used to ensure that all values, within each column vector, were stored in volatile memory in that particular fixed size. However, some CPUs may support multiple expected sizes. For example, a CPU may be able to perform a SIMD operation on four 8-byte values in a 256 bit register, or eight 4-byte values in the 256 bit register. In such a system, different data items may be padded to different fixed-length sizes.

In one embodiment, a column vector is broken into "chunks", where all values within a chunk are padded to the same fixed width, but the fixed width may vary from chunk to chunk. For example, all values within one chunk may be represented by four bytes, while all values in the next chunk may be represented in eight bytes.

According to one embodiment, when multiple expected sizes are supported, the fixed size used to represent values in any given chunk is selected to be the smallest expected size in which all of the values in the chunk may be represented. For example, for a chunk in which all values can be represented by 4-bytes, all values would be padded, as needed, to be 4-bytes wide. On the other hand, for a chunk that has at least one value that requires more than four bytes, all values would be padded, as needed to be 8-bytes wide.

When the values from a chunk are loaded into a register for a SIMD operation, the CPU determines whether to treat the chunk as a series of 4-byte values, or a series of 8-byte values, based on the expected size to which the chunk was padded. The boundaries between the chunks of a column vector, as well as the expected size to which the values in each chunk were padded, may be maintained as metadata within the column vector itself, or may be maintained separate from the column vector.

Exception Markers

There may be situations where a relatively small percentage of column values are very large. Padding all values to achieve a fixed size that accommodates even such very large values may be wasteful. For example, if a column contains a thousand values that fit into one byte, and one value that requires eight bytes, it would be wasteful to pad the thousand values so that each consumes eight bytes. Using column vector chunks, the memory would be wasted only for those values that fell into the same chunk as the very large value.

Instead of, or in addition to, using column vector chunks as described above, the amount of wasted memory can be further reduced by removing, from a column vector, all exceptionally large values. These exceptionally large values may be stored elsewhere, and may be replaced within the column vector with a "marker" value. The marker value indicates that the actual value is so large that it is stored elsewhere. The marker value, as well as the other values in the column vector, may be padded as necessary to achieve a relatively small fixed size.

As the values from the column vector are processed within a CPU, the CPU detects when a marker value is present, and performs additional steps to retrieve and process the actual value that corresponds to the marker value. Thus, at the expense of the overhead required for separately retrieving and handling exceptionally large values, the overall memory consumption of a column vector of padded, fixed-size values, may be significantly reduced.

Variable-Length in-Memory Representation

While storing relational values within volatile memory 330 with padding to match the expected size facilitates the performance of vector processing operations, it also consumes more memory and decreases the rate at which CPU 340 is able to fetch useful data. Therefore, embodiments are provided in which the values within the column vectors within volatile memory 330 are stored in a variable-length format. The variable-length format may involve variable byte width and/or variable bit width. The various types of variable-length formats shall be described in greater detail hereinafter.

In embodiments that store values in variable-length format, the length of the individual values within each column vector may either be stored interspersed with the data, within the column vector, or in a "length vector" that is maintained separate from the column vector itself. FIG. 6 illustrates an embodiment in which a separate length vector 618 is maintained in association with column vector 404. Length vector 618 includes information from which the boundaries, between the individual values within column vector 404, may be derived.

In an embodiment that uses separate length vectors, the length vectors may themselves be further compressed using run length encoding and bit packing. This type of compact storage avoids waste of volatile memory 330 that would otherwise occur if variable-length column values were padded and stored, within volatile memory 330, in a fixed length format that is wide enough to accommodate the widest column value.

Within in-memory column vectors, the variable-length format may be compressed or uncompressed. Using an uncompressed variable-length format may allow the values to be transferred to the CPU and operated on without the additional overhead of decompression. On the other hand, a compressed variable-length format allows values to be transferred to a CPU at a faster rate. Further, depending on the compression format and the type of operation involved, the overhead associated with decompression may be avoided because performing the operations on the compressed variable-length values will still yield the correct results.

Figure 8:
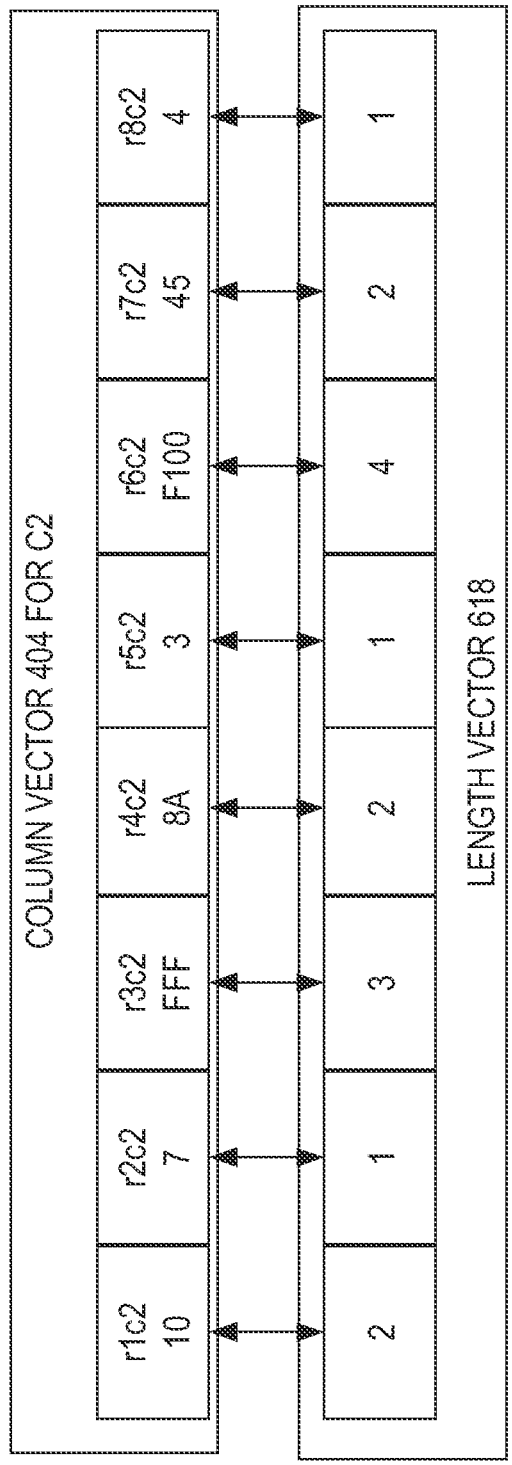
FIG. 8 is a block diagram illustrating a length vector that indicates lengths of individual column values of a column vector that store variable-length values.

In embodiments that employ column vectors that contain variable-length column values, queries are run such that the column vectors are brought from volatile memory 330 into the CPU 340 as a stream of bytes (or two streams—one stream for the variable-length value stream and a second stream for the length), instead of a vector of fixed length values. For example, assume that the values (r1c2, r2c2, r3c2, r4c2, r5c2, r6c2, r7c2, r8c2) of column vector 404 are respectively 10, 7, FFF, 8A, 3, F100, 45, 4 (in hexadecimal), as illustrated in FIG. 8. Based on these values, the length vector 618 would be 2, 1, 3, 2, 1, 4, 2, 1. Specifically, as illustrated in FIG. 8, the first value (i.e. "2") within the length vector 618 indicates the two-byte length of the first value (i.e. "10") in column vector 404, the second length vector value (i.e. "1") indicates the one-byte length of the second value (i.e. "7") in column vector 404, etc.

Variable-Width Dictionary Encoding

The techniques described herein are not limited to any particular variable-width format. However, for the purpose of explanation, an encoding technique is described hereafter that may be applied to a column when, for example, all values in the column are 4 bytes or less. The technique produces a vector that encodes the combination of lengths for each set of 4 values, and a packed vector of the actual values themselves. To do predicate evaluation, the values are dynamically unpacked into registers in the CPU. The same basic approach can apply to a variable-width dictionary format, either bit-aligned or byte-aligned.

Specifically, consider the case where a skewed dictionary has only two possible lengths of codes, n and m. The most common values are assigned to codes that are n bits wide, while the less common values are assigned to codes that are m bits. In this example, the dictionary can be said to have two levels, where the first level contains the mapping between common values and n-bit codes, and the second level contains the mapping between less-common values and m-bit codes.

In a dictionary that employs codes of two lengths n and m, there may be any combination of two lengths, such as n=6 and m=11. However, for the purpose of explanation, it shall be assumed that n=8 and m=16. Having the code lengths byte aligned simplifies matters because there is less complicated shifting and masking.

To represent a great number of values in fewer bytes, the vector of values contains the codes from the dictionary, rather than the values actually represented by the codes. Consequently, in the present example, the vector of values would include a series of 8 and 16 bit dictionary codes. For example, assume that value X is mapped to code n1 (an n-bit code), value Y is mapped to code n2 (an n-bit code), and value z is mapped to code m1 (an m-bit code). If the values in a column are X, X, Z, Y, then the vector of values for that column would contain n1, n1, m1, n2.

In this scenario, the vector encoding the lengths may have one byte per 8 values from the value vector. The one byte would encode the length combination, of the 256 possible length combinations, represented by the corresponding 8 values in the value vector. For example, each bit within the byte may correspond to a respective one of the eight values, where the bit is a "1" if the corresponding value is an n-bit code, and a "0" if the corresponding value is an m-bit code. Consequently, the byte within the length vector for the eight values n1, n1, m1, n2, n2, m2, m3, n3 would be "11011001".

According to one embodiment, the codes used by the dictionary are assigned such that, within each level of the dictionary, codes have the same relationship as their corresponding values. That is, for any two n-width codes, if n1>n2, then the value mapped to n1 is greater than the value that is mapped to n2. Similarly, for any two m-width codes, if m1>m2, then the value mapped to m1 is greater than the value mapped to m2.

To run a simple (in)equality predicate (e.g. c1>X) on the dictionary, the constant value X is first translated to the corresponding thresholds for each of the two levels of the dictionary. For the purpose of explanation, it shall be assumed that X translates to n7 in the n-bit-wide level of the dictionary, and translates to m9 in the m-bit-wide level of the dictionary. After translating the constant, the first value in the encoded length vector is read. That value is used to look up the correct shuffle and mask to put the first 8 values into a 16 byte register, similar to what is done for a fixed-width dictionary. Based on the encoded lengths, the two constant threshold values must be shuffled appropriately, so that the one byte threshold aligns with the one byte codes and the two byte threshold aligns with the two byte codes.

For example, assume that the first value in the encoded length vector is "11011001". Based on this value, it is determined that the first 8 values in the value vector should be compared against thresholds n7, n7 m9, n7, n7, m9, m9 and n7, respectively. After this transformation has been performed, a SIMD compare is performed between the values and the corresponding thresholds. A shift is then performed, and the process is repeated for the next 8 values.

While this encoding technique is similar to Huffman style encoding, it is not prefix-free. The encoding need not be prefix-free because the lengths are encoded in a separate vector. Thus, the encoding may be considered to be a prefix-free code with (n+1) bits and (m+1) bits, but with the first bit of every code stored in a separate vector.

In one embodiment, this encoding technique is extended to more than two possible lengths. With three possible lengths, the most useful combination would typically be 1, 2, and 4 bytes. Under those conditions, the lengths of 4 values could be encoded and processed at a time. For four possible lengths, any combination of 1-4 bytes could be encoded. Two bits would be used to encode each length.

The encoding technique described in this section could be combined with other encoding and/or compression techniques, such as run-length encoding ("RLE"). When combined with RLE, increments are only performed once per run, rather than once per value, when calculating the frequencies of each value in order to decide which value to assign to which length.

On-Chip Padding

Unfortunately, CPUs may not be capable of performing vector processing operations directly on the variable-length values. Consequently, in systems that only support performing vector processing operations on fixed length values, additional processing must occur on the CPU to enable arithmetic operations (e.g. comparison, addition, etc.) to be performed directly on the individual elements efficiently.

According to one embodiment, any padding required to conform individual values to the size of vector-processing registers used by CPU 340 is performed after the values have been transferred to CPU 340 over I/O path 350. Specifically, on one embodiment, CPU 340 is designed to sequentially process portions of the value stream in a two-phase process. In the first phase, conversion logic 630 on the CPU 340 converts a sequence of variable-length values into a form that can be placed in register 346 for vector processing. In the second phase, the appropriate vector processing operation is performed, in parallel, on the values within the register 346. The two phases are performed either in separate cycles, or together.

For example, assume that the value stream 107FFF8A3F100454 for column vector 404 has been fed from volatile memory 330 into CPU 340 for a vector processing operation. Assume further that storage locations 604-610 are designed to operate on fixed-length four-byte values. Based on the sizes indicated in length vector 618, which have also been provided to CPU 340 over I/O path 350, CPU 340 knows that the lengths of the values in the value stream are 2, 1, 3, 2, 1, 4, 2, 1.

Based on the length information contained in length vector 618, conversion logic 630 performs the following steps during the first phase of the vector processing operation:
  determines that the first two bytes of the value stream are for r1c2, and adds two additional bytes of padding to r1c2 to produce 1000
  determines that the next one byte of the value stream is for r2c2, and adds three additional bytes of padding to r2c2 to produce 7000
  determines that the next three bytes of the value stream are for r3c2, and adds one additional byte of padding to r3c2 to produce FFF0
  determines that the next two bytes of the value stream are for r4c2, and adds two additional bytes of padding to r4c2 to produce 8A00
  determines that the next one byte of the value stream are for r5c2, and adds three additional bytes of padding to r5c2 to produce 3000

In the embodiment illustrated in FIG. 6, only four storage locations 604-610 are available for performing the vector processing operation. Consequently, the remainder of the values within the value stream of column vector 404 (i.e. r5c2, r6c2, r7c2 and r8c2) are padded in a subsequent iteration of the first phase.

Once the values have been padded and placed in the appropriate storage locations 604-610, the second phase of the vector processing operation is performed. In the second phase of the vector processing operation, CPU 340 issues a second instruction from instruction pool 620 to execute an arithmetic operation on the values within storage locations 604-610, in parallel. The arithmetic operation may be, for example, a comparison between each of those values and a byte-comparable version of the value "30".

On-chip padding is also useful in situations that do not involve vector processing operations. For example, variable width data may be read in and padded on chip, but processed only one element at a time (i.e. not SIMD). One element at a time processing may be required, for example, when the width of the data elements is so large that multiple data elements will not fit within a single register. On-chip padding is useful even in these situations because the variable-width storage saves space in volatile memory, and the fixed-width elements that result from the on-chip padding enable the native binary ALU comparisons to be performed on the stream of values with minimal processing overhead per comparison.

Vector Processing Operations on Variable-Length Data

In the embodiment described above, column values are passed to the CPU in variable-length format, and the first phase of each vector processing operation involves padding the column values to produce a vector of fixed-length values. While transferring column values from volatile memory 330 to CPU 340 in variable-length format allows CPU 340 to be fed column values at a faster rate over the fixed bandwidth of I/O path 350, the overhead associated with converting the variable-length values into fixed-length values, within CPU 340, decreases the rate at which CPU 340 can process those column values. Further, increasing the size of the values (by adding padding) prior to performing the vector processing operation reduces the number of values that can fit within register 346 during any given iteration of the vector processing operation.

Figure 7:
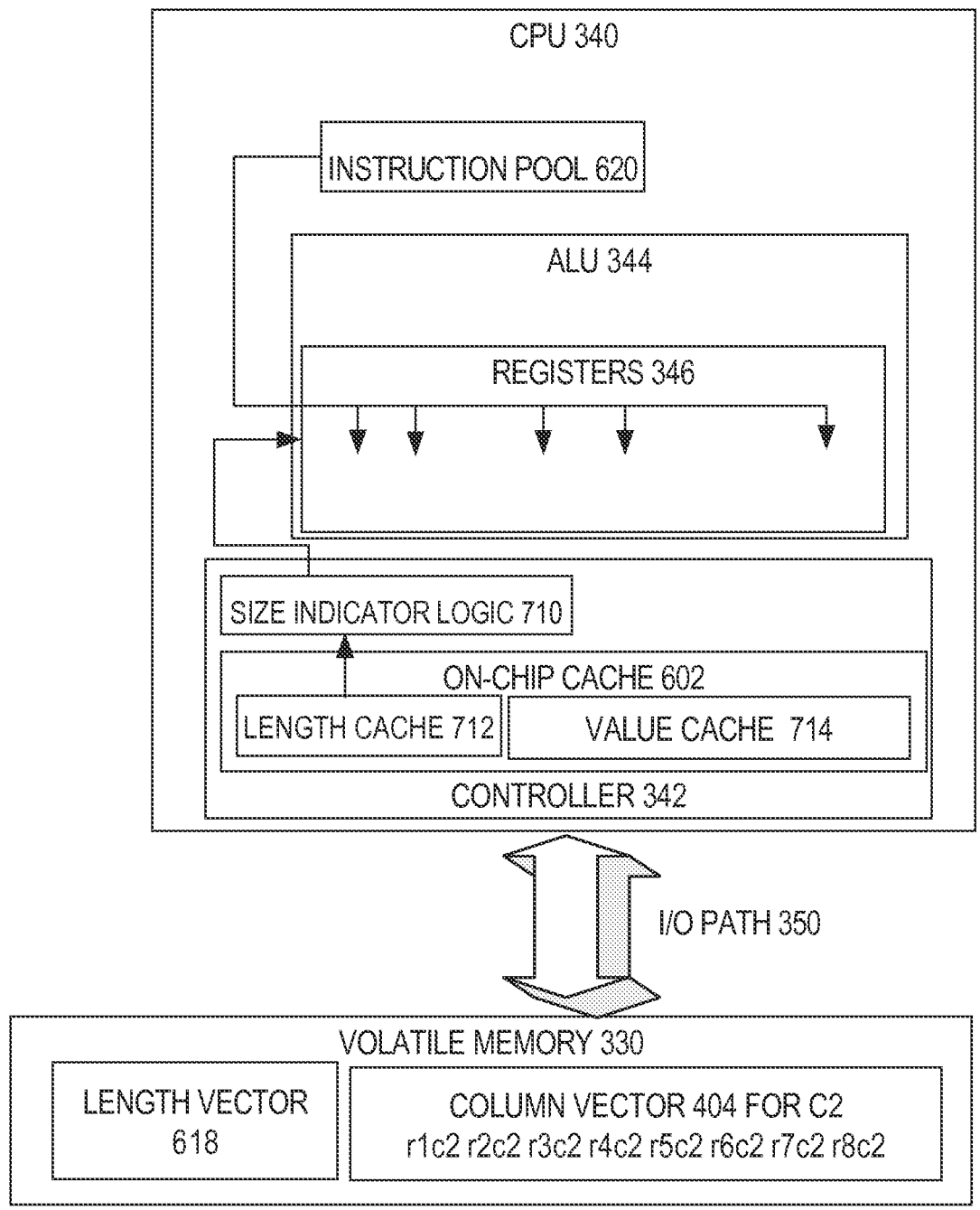
FIG. 7 is a block diagram illustrating a CPU configured to perform vector processing operations directly on variable-length values, according to an embodiment of the invention.

Accordingly, in an alternative embodiment, the need to perform variable-length to fixed-length value conversions on CPU 340 is avoided by designing CPU 340 to perform vector operations directly on unaligned bit streams by utilizing information contained in the length vector 618. FIG. 7 is a block diagram of an embodiment in which CPU 340 is configured to perform vector processing operations directly on variable-length values.

Referring to FIG. 7, conversion logic 630 has been replaced with size indicator logic 710, within the controller 342 of CPU 340. Size indicator logic 710 generally represents logic that indicates to the vector processing elements within CPU 340 the respective lengths of the values currently stored in register 346 (the "target values"). In addition, fixed-length storage locations 604-610 illustrated in FIG. 6 have been removed from FIG. 7. Rather than having any fixed boundaries between the individual target values, the boundaries between the target values vary from operation to operation based on the lengths of the target values. Thus, register 346 may be implemented as a single physical register that represents multiple virtual registers, where the size of the virtual registers within the physical register are dictated by the lengths of the current target values.

A portion of I/O path 350 is used to feed portions of length vector 618 into a length cache 712 within the on-chip cache 602, and to feed portion of column vector 404 into a value cache 714 within the on-chip cache 602. The contents of value cache 714 are fed into register 346 as the target values of vector processing operations, while the contents of length cache 712 are used by size indicator logic 710 to determine the lengths of the target values involved in the vector processing operations. Those lengths are communicated by the size indicator logic 710 to the ALU 344 to enable the vector processing elements within CPU 340 to operate on the individual target values within register 346.

According to one embodiment, not only does the size of the virtual registers vary from operation to operation, but so does the number of virtual registers. Specifically, because the length of the target values vary, the number of target values that fit within register 346 during any given vector processing operation may also vary.

For example, assume that register 346 holds eight bytes of the value stream. Assume further that r1c2 and r2c2 are three-byte values, r3c2 and r4c2 are two-byte values, and r5c2, r6c2, r7c2, and r8c2 are one-byte values. Under these circumstances, during the first iteration of the vector processing operation, register 346 would hold only three values (e.g. r1c2, r2c2 and r3c2), whereas during the second iteration of the vector processing operation, register 346 would hold five values (r4c2, r5c2, r6c2, r7c2, r8c2). In such an embodiment, the size of the target values dictates not only how quickly CPU 340 is fed values from volatile memory 330, but also the degree of parallelism that is achieved during the vector processing operations.

Compressing and Encoding the Column Vector Values

The less memory required to represent column vector values, the faster the column vector values can be fed to CPU 340 over I/O path 350. As mentioned above, one way to reduce the amount of memory used to represent column vector values is to store those values in a variable-length format. In alternative embodiments, other value-size-reducing techniques may be used on the column vector values, instead of or in addition to representing the values in variable-length format.

For example, according to one embodiment, a "run length vector" is used to indicate the number of sequential repetitions of a value. For example, a sequence of values—33, 33, 33, 3, 4, 8, 8, 9 is represented by value vector 333489, a length vector in bytes of 2, 1, 1, 1 and a run length vector of 3, 1, 1, 2, 1. The length vector and the run length vector may be represented in a compact form as value, length pairs to save space.

As another example, any one of a number of data compression techniques may be used to compress the column vector 404. The column vector values are transferred over I/O path 350 in their compressed format, and decompressed within CPU 340 as necessary to produce values in the form required for the vector processing operation. To enable on-chip decompression of the data values, certain additional information may need to be communicated from volatile memory 330 to CPU 340. For example, certain compression techniques involve the creation of a token-to-value mapping. When such techniques are used to compress the column vector values, a token-to-value mapping is transferred to CPU 340 over I/O path 350 to enable on-chip decompression of the values.

In one embodiment, the tokens used in a token value mapping are pointers into a dictionary. In such an embodiment, the dictionary is transferred to CPU 340 over I/O path 350 to enable on-chip decompression of the values. Tokenization of column vector values may be performed instead of or in addition to run length encoding. Specifically, techniques like run length encoding or tokenization can be used stand-alone, or together. An example of using run length encoding and tokenization together may involve replacing values with codes based on a dictionary, and then applying run length encoding and the codes thus produced.

In one embodiment, information that is needed to enable on-chip decompression of the column vector values is pinned within the on-chip cache 602 of CPU 340, at least for the duration of the vector processing operation that targets the values to which that information corresponds.

Run length encoding and dictionary encoding are merely two of many types of encoding/compression techniques that may be used alone, or in combination, to reduce the amount of memory consumed by column vectors. The techniques described herein are not limited to any particular encoding/compression techniques. For example, alternative embodiments may apply one or more heavy compression techniques (e.g. LZO, ZLIB), either directly to the column values or to the results produced by applying one or more light compression techniques (e.g. packed variable width encoding, tokenization, run length encoding) to the column vectors.

Vector Processing Directly on Compressed/Encoded Data

Transferring column vector values between volatile memory 330 and CPU 340 in a compressed and/or encoded format increases the rate at which CPU 340 may be fed the column values required to perform a database operation. However, decompressing and/or decoding the values within CPU 340 incurs additional overhead that may increase the pipeline within CPU 340 and/or increase the number of instructions that must be executed to perform a vector processing operation. Therefore, according to one embodiment, the increased throughput across I/O path 350 is achieved without on-chip decompression overhead by employing a compression/encoding technique that produces values upon which the vector processing operation may be directly performed. For example, let c( ) represent the compression function used to compress the column vector values. If c(x)>c(y) is guaranteed to produce the same results as x>y, then the vector processing operation may be performed directly on the compressed column values. In particular, to evaluate the predicate c2>30, the compressed values of c2 would be directly compared to the value produced by compressing "30".

A variety of techniques may be used to ensure that comparisons of compressed representations of values yield the same result as comparisons of the uncompressed values. The specific technique may vary based on the compression technique employed. For example, in an embodiment that compresses values by replacing longer values with smaller tokens, the tokens that are used to replace the longer values may be selected so that the tokens used to replace lower values are lower than the tokens used to replace higher values. In a specific embodiment that employs such a technique, values may be replaced by pointers into a dictionary that contains the values. Within the dictionary, the values may be ordered in a manner to ensure that the pointers to lower values will themselves be lower than the pointers to higher values.

As another example, assume that run length encoding is used to reduce the size of column vector 404. The vector processing operation can be performed directly on the values in the run-length-encoded column vector. However, each value in the run-length-encoded column vector can represent values from multiple rows. The number of rows represented by any single value in the run-length-encoded column vector is indicated by the run length vector. Consequently, when a vector processing operation is performed directly on a value in a run-length-encoded column vector, the run length vector is used to determine the number of rows to which the result applies.

For example, if column c2 has the value "3" for four consecutive rows, the column vector 404 would contain a single value "3" for the four rows, and the run length vector would indicate "4", meaning that four consecutive rows have the value "3". During the vector processing operation, the single instance of the value "3" from the column vector 404 would be compared to "30". The predicate 3>30 evaluates to "false". However, rather than have the resulting "false" apply to a single row, the number of rows to which the "false" applies is dictated by the corresponding value in the run length vector. In the present example, the "false" produced by evaluating 3>30 would apply to four rows.

When operations performed on compressed data are not guaranteed to produce the same results as operations on uncompressed data, the compressed/encoded data may need to be decompressed/decoded prior to evaluating a predicate that references the data. For example, if zlib is used for compression, then the compressed data may need to be decompressed on the fly, in the CPU. Once decompressed, the decompressed output may be fed to the vector processing, as described in above.

Compressing Decoding Data

Many of the various techniques described above for increasing the rate at which column values can be transferred from volatile memory 330 to CPU 340 require information, other than the column values themselves, to be communicated from volatile memory 330 to CPU 340. The information required by CPU 340 to decompress, interpret and/or decode the column vector is referred to herein generally as "decoding data". The type of decoding data required by CPU 340 may vary from implementation to implementation, based on the encoding and/or compression techniques used to generate an encoded/compressed column vector.

For example, when the column values are transferred to CPU 340 in a variable-length format, the decoding data may include a length vector 618. In particular, length vector 618 is provided to CPU 340 to enable CPU 340 to determine where each individual column value starts and ends within the column vector 404.

As another example, when column values are transferred to CPU 340 in a run-length-encoded format, the decoding data may include a run-length vector. In particular, a run length vector is provided to CPU 340 to enable CPU 340 to determine how many rows each value in column vector 404 corresponds to.

As yet another example, when column vector 404 is compressed, the decoding data may include certain information (such as a token-to-value mapping) required by CPU 340 to enable CPU 340 to perform on-chip decompression of the individual column vector values.

Unfortunately, passing the decoding data to CPU 340 consumes bandwidth of I/O path 350 that may otherwise be used to transfer column values. Consequently, the smaller the size of the decoding data, the greater the amount of I/O path 350 that is available for transferring column values. Therefore, according to one embodiment, the decoding data itself is encoded and/or compressed. The encoding and/or compression used to reduce the size of the decoding information may be the same or different than that used to reduce the size of the column vector.

For example, assume that column vector 404 has variable length values that are run length encoded. Under these circumstances, the decoding information for column vector 404 would include a length vector and a run length vector. To reduce the size of the decoding information, both the length vector and the run length vector may be stored in run length encoded format. Under these circumstances, the decoding information may include an addition run length vector, which would be used by CPU 340 to decode the length vector and the original run length vector, which in turn would be used to decode the column vector 404.

Vector Processing Operation Examples

In the examples given above, the vector processing operation involves comparing values from one column vector against a constant. However, vector processing operations, and the techniques described herein, are not so limited. Rather, vector processing operations may involve operations on multiple column vectors.

For example, vector processing operations may be used to evaluate a query predicate that involves a column to column comparison. The columns may be from the same table (e.g. T1.income>T1.expenses), or from different tables (T1.age>T2.age). Under these circumstances, segments from the column vectors of both columns would be loaded into the CPU, and processed in parallel during the vector processing operation.

In addition, vector processing operations may involve more than simple value-to-value comparisons. For example, vector processing operations may involve set membership operations and aggregation.

Further, when a compressed format is used, the compressed format could itself consist of multiple vectors, each of which could be processed separately, and then the results combined. For example, in addition to an RLE vector, a separate bit vector may be used to indicate which values in a column are NULL. Under these conditions, the run-lengths may be processed after the value vector is processed.

Software Implementation

Some embodiments described herein involve special hardware components on the CPU for on-chip operations, such as padding, decompression, and vector processing operations, However, in situations where a CPU does not include such hardware components, the techniques described here may still be implemented by employing software instructions which, when executed by the CPU, perform the work that would otherwise be performed by the special hardware components the CPU does not have.

For example, in the absence of specialized hardware for on-chip padding and/or decompression, the on-chip padding and/or decompression can be performed by causing the CPU to execute instructions which pad and/or decompress the values obtained, in column vector format, from volatile memory via I/O path 350. The instructions may cause the values thus obtained to be padded and/or decompressed on-chip serially, or in parallel. After being padded and/or decompressed on-chip in response to execution of software instructions, a vector processing operation is performed on the resulting values without having to first transfer the values back out to dynamic memory. Thus, even when decompression and/or padding is performed on-chip without specialized hardware, the values need only be transferred to the CPU over I/O path 350 once. Further, during that one transfer, the values are in variable-width and/or compressed formats, thereby efficiently using the limited bandwidth available on I/O path 350.

The techniques described herein may even be implemented on a CPU that does not have hardware support for vector processing operations. In the absence of vector processing registers, the CPU may simply execute instructions to perform serially what would otherwise have been done in parallel using vector processing registers. For example, when the predicate of the query is "where c2>30", the values from the column vector c2 can be iteratively compared to 30 in response to executing instructions on the CPU. While it is generally less efficient to employ serial execution of what would otherwise be performed in parallel using specialized hardware, the overall query execution may still be improved by the maximizing the use of I/O path 350.

When designed for a particular hardware environment, emulators of specialized hardware may be hard-coded to take advantage of the specific hardware that is present in that hardware environment. Further, when designed for hardware-independent use, emulation software may be designed to first detect what hardware is present in the environment in which the emulation software is executing, and then make use of the detected hardware capabilities when emulating vector processing, padding and/or decompression hardware.

Software Implementation Example

On-Chip Decompression

As mentioned above, in the absence of specialized hardware for generating a result vector for a specific operation called for in the predicate, programming may be used to cause the CPU to perform the operations that would otherwise be performed by the specialized hardware. For example, assume that the operation specified in a predicate is a "col1<7", requiring all values from the column col1 to be compared with a constant value "7".

Performing an operation that compares the values from col1 to "7" produces an output bit vector, where each bit in the output bit vector indicates whether a corresponding value from col1 is less than "7". For example, assume that the values in col1 are "5, 9, 8, 6, 3, . . . " Based on these values, the output bit vector produced by the comparison would be "10011 . . . "

For the purpose of this example, assume that the processor does not have specialized hardware for performing on-chip decompression of an RLE compressed column vector. Assume further that the column values have a fixed datawidth of 8.

Under these conditions, the result vector of the less-than operation may be generated by calling a software-implemented less-than function (comp_lt). For example, the application that requests the less-than operation (the "caller") may make use of the less-than function by performing the following:

1. Define a result column vector (res) with an allocated bit vector. The bit vector thus allocated is fully expanded (i.e. not the size of the RLE encoded data stream, but rather that of the number of rows in the column vector).
2. Define a source column vector (src) with encoding type (FIXED|RLE).
3. Define a constant source column vector (constant) with encoding type (FIXED).
4. Call the less-than comparison function comp_lt (res, src, constant, NULL).

Figure 10:
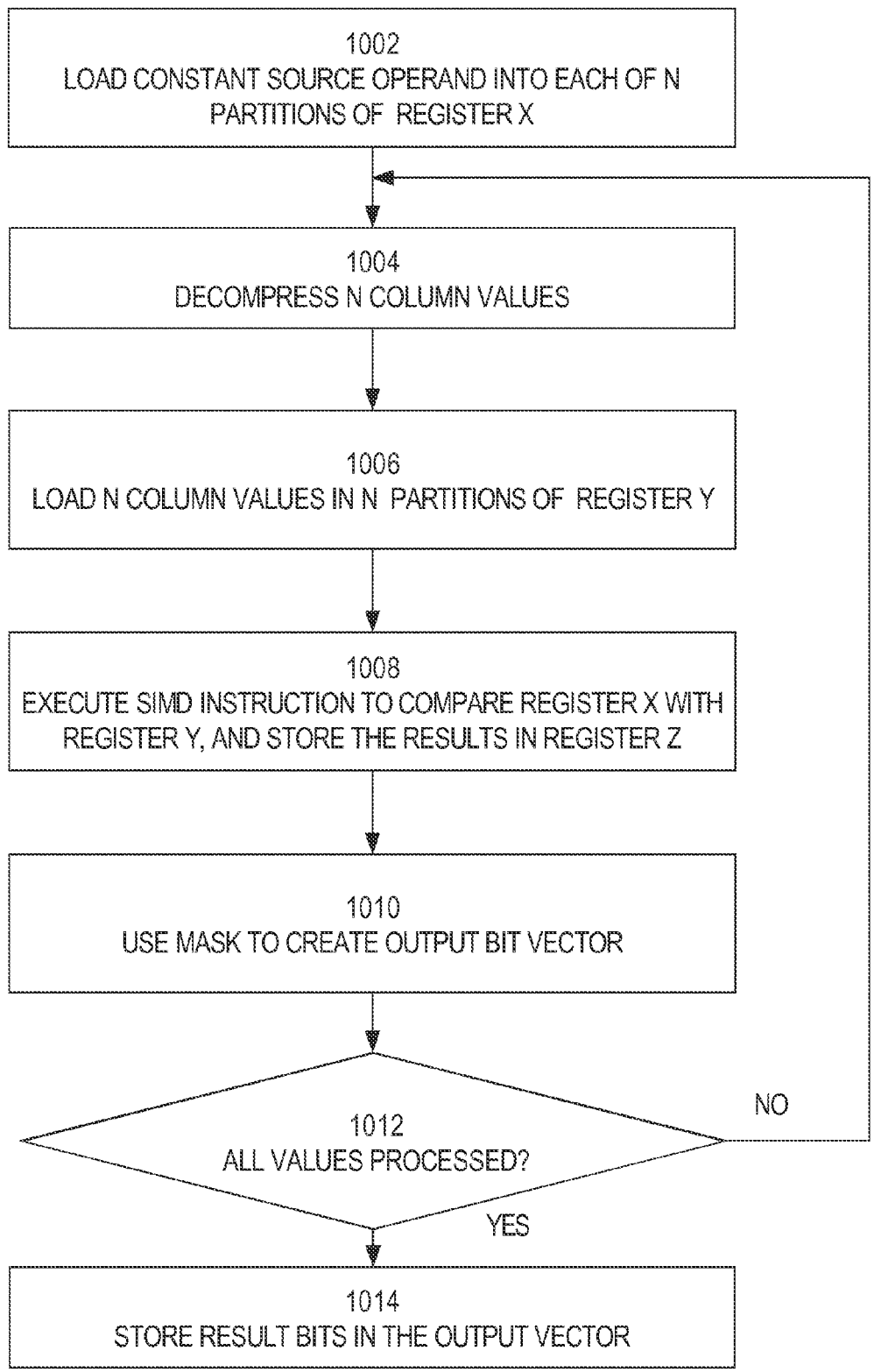
FIG. 10 is a flowchart illustrating steps for performing on-chip decompression in a CPU that does not have specialized hardware for performing the on-chip decompression, according to an embodiment of the invention.

The NULL operand of the comparison function comp_lt is a vector that indicates the positions of rows having a NULL value, as shall be described in greater detail hereafter. According to one embodiment, the software-implemented less-than function (comp_lt) performs the steps illustrated in FIG. 10 to generate the result vector of the less-than operation. Referring to FIG. 10, at step 1002 the CPU loads the constant source operand (e.g. "7") into each of N partitions of some SIMD register X.

At step 1004, the CPU performs on-chip RLE decompression to obtain N fixed-width column values from the compressed input vector. The on-chip RLE decompression may be performed, for example, by executing a function RLEdec( ) described in detail hereafter.

At step 1006, the CPU loads the N decompressed column values into some SIMD register Y. In the present example, the column values need not be padded prior to being loaded into the SIMD register Y, because the values are already fixed width. Assuming that the column has the values "5, 9, 8, 6, 3, . . . ", during step 1006 the value "5" would be loaded into the first partition of the SIMD register Y, the value "9" would be loaded into the second partition of the SIMD register Y, etc.

At step 1008, the CPU executes a SIMD instruction to compare X with Y, and storeS the result in SIMD register Z. After this comparison is performed, the first partition of the register Z would have a value produced by the comparison between "7" from the first partition of register X and "5" from the first partition of register Y. Similarly, the second partition of the register Z would have a value produced by the comparison between "7" from the second partition of register X and "9" from the second partition of register Y.

Because the partitions used to perform the SIMD comparison are 8-bits wide, the result value produced may be 8-bits wide, with only one of the bits reflecting the results of the corresponding comparison. For example, the comparison of "7" from the first partition of register X with "5" from the first partition of register Y may produce an 8-bit value in register Z in the form 1XXXXXXX, where the "1" in the first bit position indicates that "5" is less than "7", and the other seven bit positions are all zeros, or garbage. Under these conditions, the bit values that need to be placed in the result bit vector are separated, within register Z, by seven meaningless bits.

Thus, to produce the result bit vector in one embodiment, at step 1010, a mask is applied to the content of register Z to properly set the output bits of the result vector.

At step 1012, a determination is made as to whether all of the values from the column vector have been processed. Thus, if N is 8, and the column vector has 24 values, then control would pass from step 1012 back to step 1004 twice, so that all 24 values from the input column vector would be processed.

At step 1014, when all values from the input vector have been processed, the result bits are stored in the output vector (res).

In some situations, the input vector may contain null values. In such situations, the result bit produced by the SIMD operation for a comparison involving a null value may be "1". However, the comparison of a null value with any other value should be false (e.g. "0"). Therefore, according to one embodiment, a "null vector" is created that includes a "1" at each position that corresponds to a non-null value in the input column, and a "0" at each position that corresponds to a null value in the input column vector. This null vector may be used to "fix" the result vector by performing an AND operation between the result vector and the null bit vector, effectively forcing to "0" any bit in the result bit vector that corresponds to a null value in the input column vector.

On-Chip RLE Decompression

In the example given above, step 1004 involves on-chip RLE decompression, which may be performed by calling a function RLEdec( ). According to one embodiment, the RLEdec( ) function assumes that the column vector is compressed with RLE, and has a fixed data-width of 8 bits. In this example, the column vector will have a length vector (and length width) which may be ignored, since the data elements have a constant length. The result column vector produced by the RLEdec( ) function is the decompressed values from the column vector.

An RLE encoded column vector typically has a number followed by a column value. The number indicates how many times the column value should be repeated in the output vector. For example, assume that a column holds values "B" and "W", and the uncompressed content of the column is: B, B, B, W, W, B, B, B, B, B, W, W, B. Under these circumstances, the compressed column vector would be 3B2W5B2W1B. In this compressed column vector, the first value "3" is a run length value that indicates that the second value B repeats three times in the uncompressed column vector, the third value "2" is a run length value that indicates that the fourth value "W" repeats twice in the uncompressed column vector, etc.

According to one embodiment, the RLEdec( ) function operates as follows:

1. Load the first run length value from the RLE compressed column vector into some SIMD register A.
2. Load the first column value (with padding, if needed) into some SIMD register B.
3. Repeatedly copy the column value in register B into some register C, where the number of copies to make is dictated by the run length value in register A.
4. Repeat 1-3 for the next run length value/column value combination in the compressed column vector.
5. Repeat 4 until all column values have been processed.
6. Generate the final output (the uncompressed column vector) based on the contents of register C.

Depending on the size of register C, the content of register C may have to be flushed to other on-chip storage (e.g. other registers, on-chip cache 602, etc.) one or more times during the decompression process.

When used in conjunction with the process illustrated in FIG. 10, only N uncompressed column values are needed in each iteration of step 1004. The number of times steps 1-3 are repeated to obtain N uncompressed column values will vary based on the run length values within the compressed column vector. For example, if N is 10 and the first run length value is 10 or more, then steps 1-3 must be performed only once to obtain N uncompressed column values. On the other hand, if N is greater than the first run length encoding value, steps 1-3 will have to be repeated until the sum of the run length encoding values processed is equal to or greater than N.

Software Implementation Example

Comparison without Decompression

According to one embodiment, SIMD operations may be used to evaluate a predicate without decompressing the column vector of the column involved in the predicate. For example, assume again that the operation specified in a predicate is a "col1<7", requiring all values from the column col1 to be compared with a constant value "7". Assume further that col1 is constrained to four possible values "5, 7, 13 and 20". Because col1 is constrained to four possible values, each of the values may be uniquely represented by replacement codes that are two bits wide. Specifically, "5, 7, 13 and 20" may be respectively replaced with the two-bit codes "00", "01", "10" and "11". Significantly, these replacement codes have been selected in a manner that ensures that if value1>value2, then code(value1)>code (value2).

Based on the replacement code mapping described above, the values "5, 7, 13, 20, 13, . . . " from column col1 may be represented as "0001101110 . . . ", where the first two bits "00" indicate that the first column value is "5", the third and fourth bits "01" indicate that the second column value is "7", etc.

Figure 11:
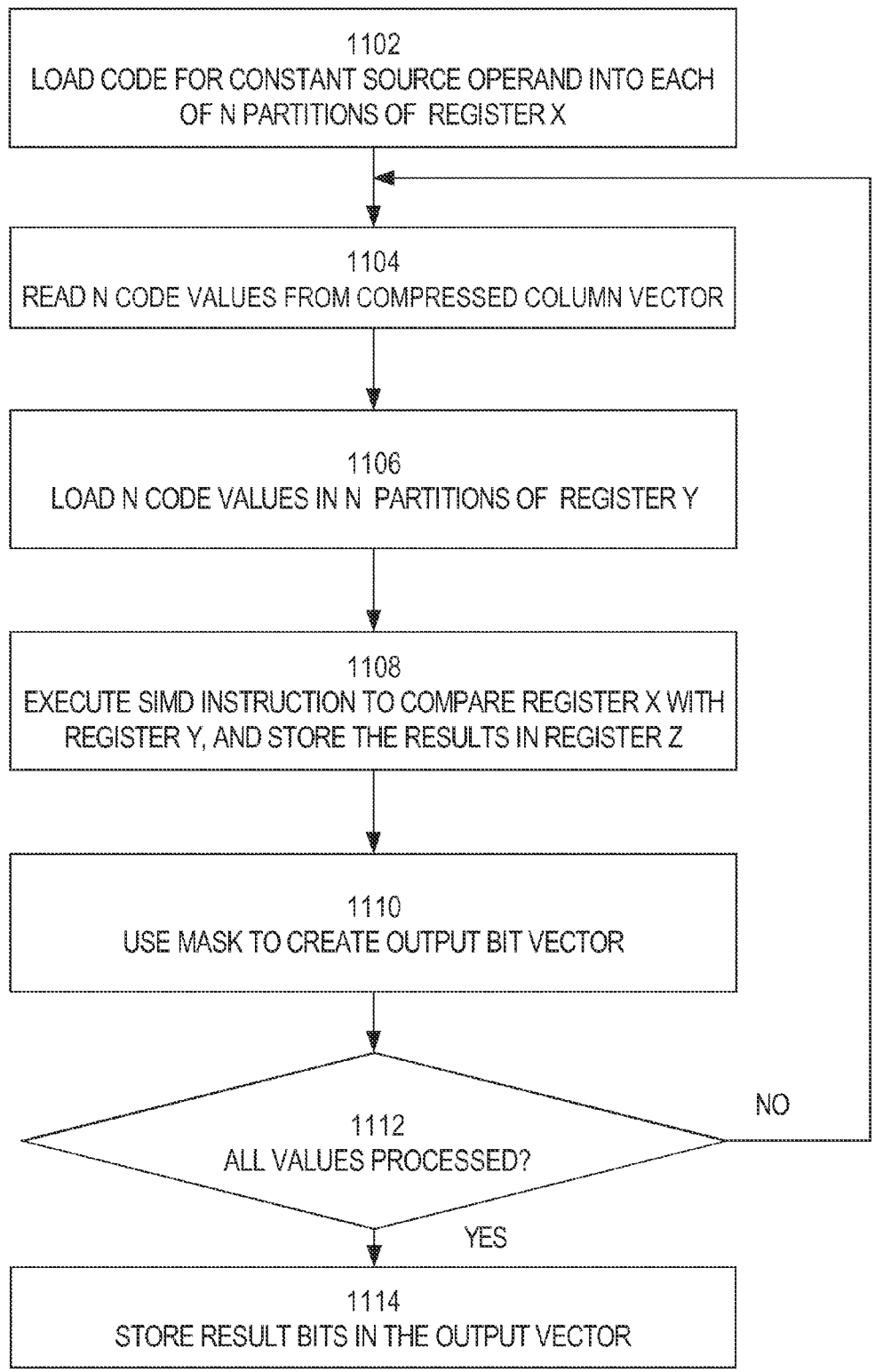
FIG. 11 is a flowchart illustrating steps for performing vector processing operations directly on compressed values, according to an embodiment of the invention.

Under these circumstances, the evaluation of the "col1<7" predicate may proceed as illustrated in FIG. 11. Referring to FIG. 11, at step 1102 the CPU loads the code of the constant source operand (e.g. the code for "7") into each of N partitions of some SIMD register X. In the present example, the code value loaded into each of the N partitions of register X would be "01". The CPU may obtain the code for the constant source operand as an input parameter to the less_than function, or by looking up the code for the constant source operand in the dictionary by which the col1 was encoded.

At step 1104, the CPU reads N code values from the compressed input vector. For the purpose of explanation. In the present example, the code values are fixed width. Thus, step 1104 involves reading N×FW bits from the compressed input vector, where FW is the fixed width of the codes.

At step 1106, the CPU loads the N code values into some SIMD register Y. In the present example, the code values need not be padded prior to being loaded into the SIMD register Y, because the code values are already fixed width. Assuming that the compressed column col1 has the values "0001101110 . . . ", during step 1006 the code "00" for "5" would be loaded into the first partition of the SIMD register Y, the code "01" for "7" would be loaded into the second partition of the SIMD register Y, etc.

At step 1108, the CPU executes a SIMD instruction to compare X with Y, and store the result in SIMD register Z. After this comparison is performed, the first partition of the register Z would have a value produced by the comparison between the code "01" of "7" from the first partition of register X and the code "00" of "5" from the first partition of register Y. Similarly, the second partition of the register Z would have a value produced by the comparison between the code "01" of "7" from the second partition of register X and the code "01" of "7" from the second partition of register Y.

At step 1110, a mask is applied to the content of register Z to properly set the output bits of the result vector.

At step 1112, a determination is made as to whether all of the values from the compressed column vector have been processed. Thus, if N is 8, and the column vector has 24 values, then control would pass from step 1112 back to step 1104 twice, so that all 24 values from the input column vector would be processed.

At step 1114, when all values from the input vector have been processed, the result bits are stored in the output vector (res). For the reasons given above, a null vector may then be used to "fix" the result vector by performing an AND operation between the result vector and the null bit vector, effectively forcing to "0" any bit in the result bit vector that corresponds to a null value in the input column vector.

Software Implementation Example

On-Chip Padding

As another example, assume that the column col1 involved in a less than operation stores variable-width values which have a maximum data width of 4 bytes. In this case, the column vector will have a non-null length vector and length width. For purpose of illustration, assume that there are no null values in col1, and that the length is encoded using two bits. For example, if the first four values in col1 are "<ab><a><b><abcd>", then the first four values in the length vector would be "<01><00><00><11>", indicating that the first four values have two bytes, one byte, one byte, and four bytes, respectively. For the purpose of illustration, further assume that the column does not have any trailing zeros.

According to one embodiment, the caller that is requesting performance of the predicate evaluation performs the following:
1. Define a result column vector (res) with an allocated bit vector.
2. Define a source column vector (src) with encoding type (DYN_PAD).
3. Define a constant source column vector (constant_cv) with encoding type (CONSTANT). The "num_of_rows" should be 1, and the "is constant value" flag in the encoding context should be set. Store the constant in the data stream with the same width (i.e. 32 bits, in this example).
4. Call comp___less_than (res, src, constant_cv, NULL).

Figure 12:
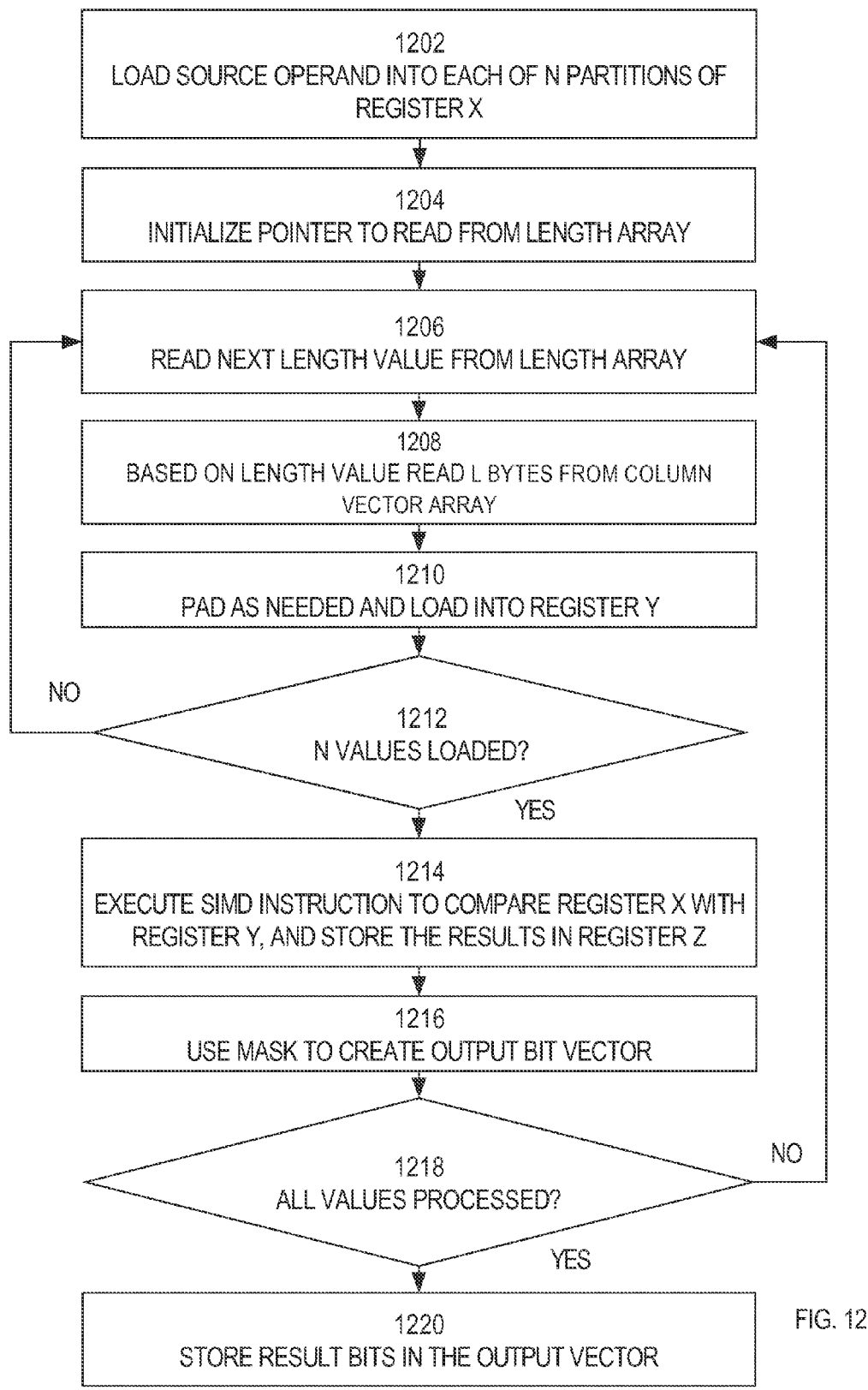
FIG. 12 is a flowchart illustrating steps for performing on-chip padding in a CPU that does not specialized hardware for performing the on-chip padding, according to an embodiment of the invention.

According to one embodiment, the specialized function comp_less_than performs the steps illustrated in FIG. 12 to evaluate the comparison. Referring to FIG. 12, at step 1202 the CPU loads the constant source operand (e.g. "7") into each of N partitions of some SIMD register X. At step 1204, a pointer is initialized to read from the start of padded_encoded_lens.

At step 1206, the CPU reads the appropriate (fixed) number of bits from padded_encoded_lens. In the present example, the lengths are encoded in two bits. Consequently, in step 1206, the first two bits of padded_encoded_lens are read.

In step 1208, L bytes are read from the column vector src, where L is the number of bytes indicated by the length value that was read in step 1206. For example, if the length value read in step 1206 was "01", then 2 bytes would be read from the column vector src in step 1208. On the other hand, if the length value read in step 1206 was "11", then 4 bytes would be read from the column vector src in step 1208.

At step 1210, the bytes read from src are padded to create a fixed-width value. The amount of padding is based on the number of bytes read and the size of the partitions in SIMD register Y. For the purpose of illustration, it shall be assumed that the partitions of register Y are 4-bytes wide. Thus, when a one-byte value is read from the column vector src, the value is padded with three bytes in step 1210. Similarly, when a three-byte value is read from the column vector src in step 1208, the value is padded with one byte in step 1210 prior to being loaded in a partition of register Y.

Step 1212 defines a loop, causing steps 1206, 1208 and 1210 to be repeated until N values have been dynamically padded and loaded into partitions of register Y.

At step 1214, a SIMD instruction is executed to compare the values in register X with the values in register Y, and store the result in SIMD register Z.

At step 1216, a mask is applied to the content of register Z to properly set the output bits of the result vector.

At step 1218, a determination is made as to whether all of the values from the compressed column vector have been processed. Thus, if N is 8, and the column vector has 24 values, then control would pass from step 1218 back to step 1206 twice, so that all 24 values from the input column vector would be processed.

At step 1220, when all values from the input vector have been processed, the result bits are stored in the output vector (res). For the reasons given above, a null vector may then be used to "fix" the result vector by performing an AND operation between the result vector and the null bit vector, effectively forcing to "0" any bit in the result bit vector that corresponds to a null value in the input column vector.

Modifications and Variations

The techniques described herein may be implemented in a variety of ways. For example, the column vectors may include only byte packed values or only bit packed values. As another example, the CPU processing may be done on a CPU that is NUMA-affine to the memory where the data is stored. In addition, in an embodiment where the CPU hardware does not support unpacking variable-length data streams into fixed length or byte aligned vectors, the unpacking operations can be implemented with multiple instructions. Similarly, if the CPU does not support vector instructions, the individual values can be processed using multiple instructions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
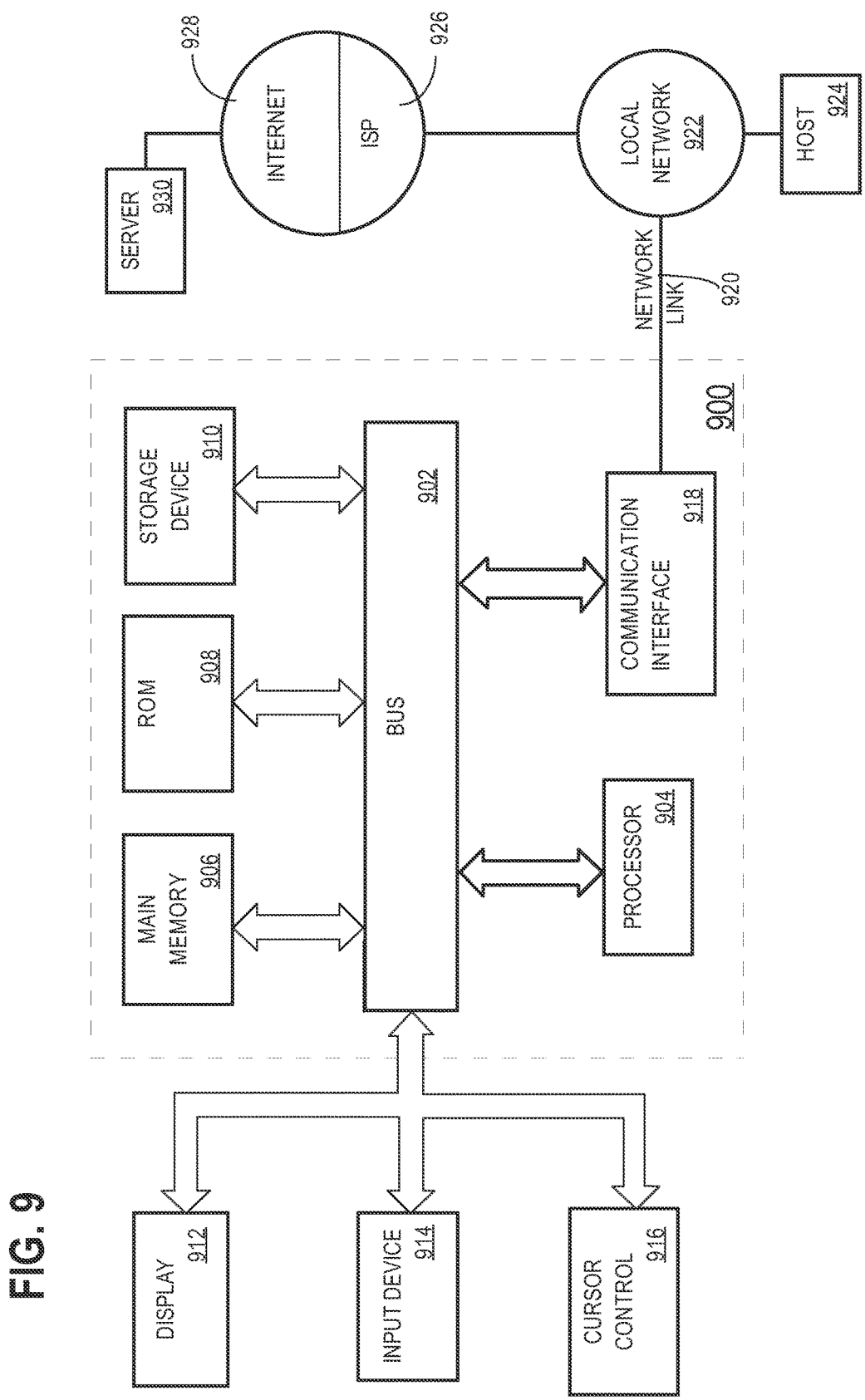
FIG. 9 is a block diagram of a computer system upon which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

For the purpose of explanation, computer system 900 has been described as several distinct functional units. However, computer system 900 may actually be implemented as a system-on-chip. For example, a memory controller and a network interface may be on chip, thereby enabling processor 904 to talk directly to main memory and the local network without going through a bus or another interface.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP)

926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, within volatile memory of a computing device that is executing a database server, a plurality of column vectors for a relational table of a relational database;
   wherein each column vector, of the plurality of column vectors, corresponds to a distinct column of the relational table;
   wherein each column vector, of the plurality of column vectors, has a contiguous array of values;
   wherein the plurality of column vectors includes a particular column vector that has a contiguous array of whole uncompressed variable-length values of a particular column of the relational table;
   in response to a database command received by the database server, the database server reading multiple values into a central processing unit (CPU) during a single clock cycle from the contiguous array of whole uncompressed variable-length values of the particular column to determine a result set for the database command.

2. The method of claim 1 wherein, within the particular column vector of the plurality of column vectors, values for the particular column are represented in a byte-comparable format.

3. The method of claim 1 further comprising during execution of a database command, transferring data from the particular column vector to the CPU of said computing device without converting values from the particular column vector to a fixed length format.

4. The method of claim 3 further comprising converting, by the CPU, values from the particular column vector to a particular fixed length format.

5. The method of claim 4 wherein:
   the method further comprises performing, within the CPU, an operation on multiple values from the particular column vector in said particular fixed length format;
   no values in said particular fixed length format are transferred out of the CPU during or between the performance of said converting and said operation.

6. The method of claim 4 wherein:
   said converting comprises converting a first subset of values from the particular column vector to a first fixed length format and converting a second subset of values from the particular column vector to a second fixed length format;
   said first fixed length format is shorter than said second fixed length format.

7. The method of claim 3 wherein execution of the database command comprises processing, within the CPU, a single-instruction multiple-data (SIMD) instruction that performs an operation on multiple values, from the particular column vector, in parallel.

8. The method of claim 7 wherein said SIMD instruction begins and finishes execution during a same clock cycle.

9. The method of claim 7 wherein:
   the method further comprises detecting whether said CPU supports said SIMD instruction;
   executing said SIMD instruction if said CPU supports said SIMD instruction;
   emulating, by executing multiple instructions, said SIMD instruction if said CPU does not support said SIMD instruction.

10. The method of claim 3 further comprising performing, by the CPU, a comparison operation required by the database command on values from the particular column vector without converting the values to a fixed length format.

11. The method of claim 1 further comprising maintaining within said volatile memory, for each column vector of at least one of said plurality of column vectors, a respective length vector containing a plurality of length values that indicate an amount of memory needed to store each value of said each column vector.

12. The method of claim 11 wherein said respective length vector of said each column vector comprises length values that are compressed.

13. One or more non-transitory computer-readable media comprising stored instructions wherein:
   said stored instructions comprise first instructions that, when executed by one or more processors, cause maintaining, within volatile memory of a computing device that is executing a database server, a plurality of column vectors for a relational table of a relational database;
   the plurality of column vectors includes a particular column vector that has a contiguous array of whole uncompressed variable-length values of a particular column of the relational table;
   said stored instructions comprise second instructions that, when executed by the one or more processors, cause during execution of a database command, transferring data from the particular column vector to a central processing unit (CPU) of said computing device without converting values from the particular column vector to a fixed length format;
   each column vector, of the plurality of column vectors, corresponds to a distinct column of the relational table;
   each column vector, of the plurality of column vectors, has a contiguous array of values;
   said stored instructions comprise third instructions that, when executed by the one or more processors, cause in response to a database command received by the database server, the database server reading multiple values into a central processing unit (CPU) during a single clock cycle from the contiguous array of whole uncompressed variable-length values of the particular column to determine a result set for the database command.

14. The one or more non-transitory computer-readable media of claim 13 wherein said stored instructions comprise instructions that, when executed by said one or more processors, cause converting, by the CPU, values from the particular column vector to a particular fixed length format.

15. The one or more non-transitory computer-readable media of claim 14 wherein:
said stored instructions comprise instructions that, when executed by said one or more processors, cause performing, within the CPU, an operation on multiple values in said particular fixed length format;
no values in said particular fixed length format are transferred out of the CPU during or between the performance of said converting and said operation.

16. The one or more non-transitory computer-readable media of claim 14 wherein:
said converting comprises converting a first subset of values from the particular column vector to a first fixed length format and converting a second subset of values from the particular column vector to a second fixed length format;
said first fixed length format is shorter than said second fixed length format.

17. The one or more non-transitory computer-readable media of claim 13 wherein execution of the database command comprises processing, within the CPU, a single-instruction multiple-data (SIMD) instruction that performs an operation on multiple values, from the particular column vector, in parallel.

18. The one or more non-transitory computer-readable media of claim 17 wherein:
said stored instructions comprise instructions that, when executed by said one or more processors, cause:
detecting whether said CPU supports said SIMD instruction;
executing said SIMD instruction if said CPU supports said SIMD instruction; and
emulating, by executing multiple instructions, said SIMD instruction if said CPU does not support said SIMD instruction.

19. The one or more non-transitory computer-readable media of claim 13 wherein said stored instructions comprise instructions that, when executed by said one or more processors, cause performing, by the CPU, a comparison operation required by the database command on values from the particular column vector without converting the values to a fixed length format.

20. The one or more non-transitory computer-readable media of claim 13 wherein said stored instructions comprise instructions that, when executed by said one or more processors, cause maintaining within said volatile memory, for each column vector of at least one of said plurality of column vectors, a respective length vector containing a plurality of length values that indicate an amount of memory needed to store each value of said each column vector.

* * * * *

UNITED STATES PATENT AND TRADEMARK OFFICE
CERTIFICATE OF CORRECTION

PATENT NO. : 9,965,501 B2
APPLICATION NO. : 14/955368
DATED : May 8, 2018
INVENTOR(S) : Ellison et al.

Page 1 of 1

It is certified that error appears in the above-identified patent and that said Letters Patent is hereby corrected as shown below:

On the Title Page

In Column 1, under item Notice, Line 3, delete "days. days." and insert -- days. --, therefor.

In the Specification

In Column 5, Line 30, after "faster" insert -- . --.

In Column 14, Line 22, after "3000" insert -- . --.

In Column 20, Line 10, after ""10011 . . ."" insert -- . --.

Signed and Sealed this
Thirtieth Day of October, 2018

Andrei Iancu
*Director of the United States Patent and Trademark Office*